US012767600B2

(12) United States Patent
Koketsu et al.

(10) Patent No.: US 12,767,600 B2
(45) Date of Patent: Oct. 20, 2026

(54) POWDER FOR CERAMIC SHAPING, METHOD OF MANUFACTURING CERAMIC SHAPED OBJECT, CERAMIC SHAPED OBJECT, AND DEVICE

(71) Applicant: CANON KABUSHIKI KAISHA, Tokyo (JP)

(72) Inventors: Naoyuki Koketsu, Tokyo (JP); Nobuhiro Yasui, Kanagawa (JP); Takuya Yoshioka, Kanagawa (JP); Chiaki Arii, Tokyo (JP); Yasuhiro Sekine, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 18/636,418

(22) Filed: Apr. 16, 2024

(65) Prior Publication Data

US 2024/0360042 A1 Oct. 31, 2024

(30) Foreign Application Priority Data

Apr. 28, 2023 (JP) ................................ 2023-075157
May 25, 2023 (JP) ................................ 2023-086397
Mar. 7, 2024 (JP) ................................ 2024-035293

(51) Int. Cl.
*B33Y 70/00* (2020.01)
*B28B 1/00* (2006.01)
(Continued)

(52) U.S. Cl.
CPC .......... *C04B 35/4885* (2013.01); *B28B 1/001* (2013.01); *B33Y 10/00* (2014.12);
(Continued)

(58) Field of Classification Search
None
See application file for complete search history.

(56) References Cited

U.S. PATENT DOCUMENTS 4,820,666 A 4/1989 Hirano et al.
10,759,712 B2 9/2020 Yasui et al.
(Continued)

FOREIGN PATENT DOCUMENTS

JP 2003-89576 A 3/2003
JP 2003-128461 A 5/2003
(Continued)

*Primary Examiner* — Mohammad M Ameen
(74) *Attorney, Agent, or Firm* — Venable LLP

(57) ABSTRACT

Provided is a powder for ceramic shaping including oxide particles, wherein the oxide particles each contain a plurality of kinds of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions.

$$77.64 \le \alpha \le 93.06$$

$$4.42 \le \beta \le 6.49$$

$$0.72 \le \gamma \le 17.29$$

12 Claims, 6 Drawing Sheets

(51) Int. Cl.

| | |
|---|---|
| ***B33Y 10/00*** | (2015.01) |
| ***B33Y 40/20*** | (2020.01) |
| ***C04B 35/488*** | (2006.01) |
| ***C04B 35/628*** | (2006.01) |
| ***C04B 35/64*** | (2006.01) |
| ***C04B 35/653*** | (2006.01) |

(52) U.S. Cl.

CPC ............... *B33Y 40/20* (2020.01); *B33Y 70/00* (2014.12); *C04B 35/488* (2013.01); *C04B 35/62813* (2013.01); *C04B 35/62892* (2013.01); *C04B 35/64* (2013.01); *C04B 35/653* (2013.01); *C04B 2235/3217* (2013.01); *C04B 2235/3225* (2013.01); *C04B 2235/3246* (2013.01); *C04B 2235/3418* (2013.01); *C04B 2235/5436* (2013.01); *C04B 2235/6026* (2013.01); *C04B 2235/616* (2013.01); *C04B 2235/656* (2013.01); *C04B 2235/661* (2013.01); *C04B 2235/665* (2013.01); *C04B 2235/94* (2013.01)

(56) References Cited

U.S. PATENT DOCUMENTS

| | | | |
|---|---|---|---|
| 11,285,661 | B2 | 3/2022 | Yabuta et al. |
| 11,440,850 | B2 | 9/2022 | Yasui et al. |
| 11,718,567 | B2 | 8/2023 | Yasui et al. |
| 12,024,469 | B2 | 7/2024 | Yasui et al. |
| 2002/0094929 | A1 | 7/2002 | Kawai et al. |
| 2004/0162214 | A1 | 8/2004 | Sakuta et al. |
| 2008/0160279 | A1 | 7/2008 | Djuricic et al. |
| 2010/0170785 | A1 | 7/2010 | Zhang et al. |
| 2012/0214661 | A1 | 8/2012 | Ito et al. |
| 2020/0062638 | A1 | 2/2020 | Engqvist et al. |
| 2020/0140340 | A1* | 5/2020 | Yasui .................... C04B 35/488 |
| 2021/0292240 | A1* | 9/2021 | Saito ...................... B33Y 70/00 |
| 2023/0021311 | A1 | 1/2023 | Yasui et al. |
| 2023/0072504 | A1 | 3/2023 | Xia et al. |
| 2024/0034683 | A1 | 2/2024 | Murakami et al. |

FOREIGN PATENT DOCUMENTS

| | | | |
|---|---|---|---|
| JP | 2006-327924 | A | 12/2006 |
| JP | 2011-178610 | A | 9/2011 |
| JP | 2012-41240 | A | 3/2012 |
| JP | 2015-231934 | A | 12/2015 |
| JP | 2019-19051 | A | 2/2019 |
| JP | 2022-162538 | A | 10/2022 |
| JP | 2023-72682 | A | 5/2023 |

* cited by examiner

POWDER FOR CERAMIC SHAPING, METHOD OF MANUFACTURING CERAMIC SHAPED OBJECT, CERAMIC SHAPED OBJECT, AND DEVICE

BACKGROUND OF THE INVENTION

Field of the Invention

The present disclosure relates to a powder for ceramic shaping to be used for manufacturing a ceramic shaped object by an additive manufacturing technology using a laser, a method of manufacturing a ceramic shaped object, a ceramic shaped object, and a device.

Description of the Related Art

Along with development of additive manufacturing technologies, it has been desired that elaborate and diverse ceramic shaped objects is achieved by additive manufacturing technologies each using a resin powder or a metal powder as a raw material. In recent years, there has been a demand for a raw material powder for manufacturing a ceramic shaped object excellent in thermal characteristics, such as thermal shock resistance and a low thermal expansion coefficient.

In Japanese Patent Application Laid-Open No. 2019-19051, the use of zirconium oxide is proposed.

However, a powder for additive manufacturing (layer manufacturing) using zirconium oxide disclosed in Japanese Patent Application Laid-Open No. 2019-19051 has still left room for improvement in strength of a shaped object that can be manufactured through use of the powder. A powder for layer manufacturing and a manufacturing method each capable of manufacturing a shaped object having high strength have been demanded.

In view of the foregoing, an object of the present disclosure is to provide a technology advantageous in manufacturing a ceramic shaped object having higher strength.

SUMMARY OF THE INVENTION

In order to achieve the above-mentioned object, according to a first aspect, there is provided a powder for ceramic shaping to be used in an additive manufacturing method involving performing shaping through irradiation with laser light, the powder for ceramic shaping including oxide particles, wherein the oxide particles each contain a plurality of kinds of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions.

$$77.64 \le \alpha \le 93.06$$

$$4.42 \le \beta \le 6.49$$

$$0.72 \le \gamma \le 17.29$$

In addition, according to a second aspect, there is provided a method of manufacturing a ceramic shaped object including: a placement step of placing oxide particles on a base; an irradiation step of irradiating part or a whole of the oxide particles with laser light to melt and solidify the oxide particles at a site irradiated with the laser light, to thereby provide an intermediate shaped object; and a heating step of subjecting the intermediate shaped object to heat treatment, wherein the oxide particles each contain a plurality of kinds of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions.

$$77.64 \le \alpha \le 93.06$$

$$4.42 \le \beta \le 6.49$$

$$0.72 \le \gamma \le 17.29$$

In addition, according to a third aspect, there is provided a ceramic shaped object including a plurality of kinds of elements including Zr and Si, wherein the ceramic shaped object includes a region mainly containing Zr and a region mainly containing Si, wherein at least the region mainly containing Si has a first region and a second region in a SEM image of a cross-section in a vicinity of a center of the ceramic shaped object, wherein the first region is a planar portion having a ratio between a length and an average width of less than 10 and having an area of 78.5 $\mu m^2$ or more per portion, and wherein the second region is a linear portion having an average width of 1 μm or more and having a ratio between a length and an average width of 10 or more, and is brought into contact with the first region.

In addition, a modification example includes a ceramic shaped object including a plurality of kinds of elements including Zr, Si, and Al, wherein the ceramic shaped object includes a region mainly containing Zr, a region mainly containing Si, and a region mainly containing Al, wherein an average of output signals of the Zr by SEM-EDS is larger in the region mainly containing Zr than in the region mainly containing Si, and wherein an average of output signals of the Si by SEM-EDS, an average of output signals of Y by SEM-EDS, and an average of output signals of the Al by SEM-EDS are each larger in the region mainly containing Si than in the region mainly containing Zr.

In addition, an application example includes a device including: the above-mentioned ceramic shaped object; and at least any one of an electric component, an optical component, a metal component, and a resin component.

Further features of the present invention will become apparent from the following description of exemplary embodiments with reference to the attached drawings.

DESCRIPTION OF THE EMBODIMENTS

Figure 1:
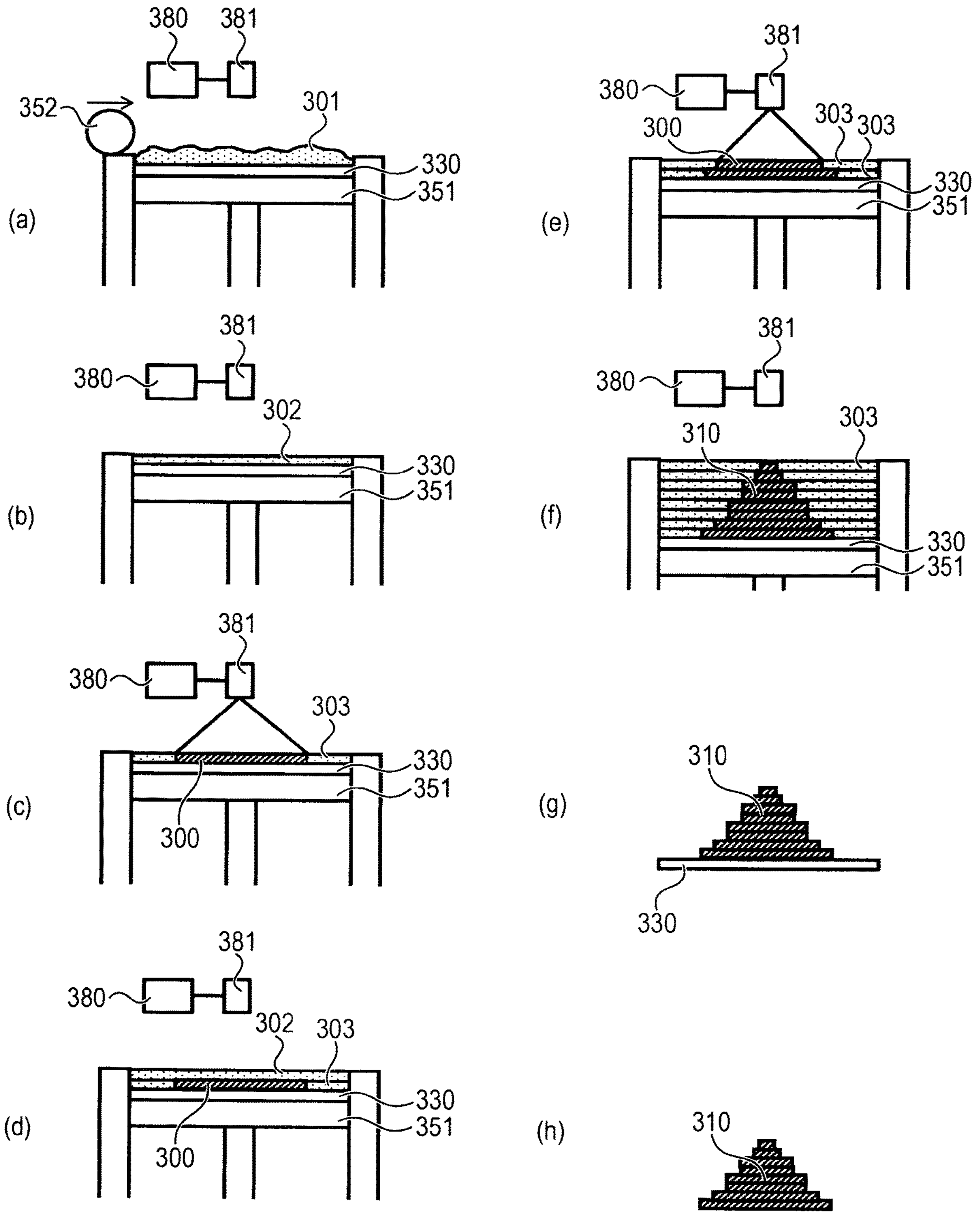
FIG. 1(*a*), FIG. 1(*b*), FIG. 1(*c*), FIG. 1(*d*), FIG. 1(*e*), FIG. 1(*f*), FIG. 1(*g*), and FIG. 1(*h*) are schematic views for illustrating an example of a method of manufacturing a ceramic shaped object of this embodiment.

Modes for carrying out embodiments of the present disclosure (hereinafter each referred to as "this embodiment") are described below with reference to the drawings. This embodiment is by no means limited to the following specific examples.

First Embodiment

The first embodiment is directed to a powder for ceramic shaping.

The powder for ceramic shaping of this embodiment is a powder for ceramic shaping to be used in an additive manufacturing method involving performing shaping through irradiation with laser light, the powder for ceramic shaping including oxide particles, wherein the oxide particles each contain a plurality of kinds of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions.

$$77.64 \leq \alpha \leq 93.06$$

$$4.42 \leq \beta \leq 6.49$$

$$0.72 \leq \gamma \leq 17.29$$

The powder for ceramic shaping (hereinafter also referred to as "material powder", "raw material powder", or simply "powder") according to this embodiment includes a plurality of particles independent of one another, and includes oxide particles to be used in an additive manufacturing method involving performing shaping through irradiation with laser light. The powder for ceramic shaping preferably contains zirconium oxide ($ZrO_2$) particles, silicon dioxide ($SiO_2$) particles, silicon monoxide (SiO) particles, and particles of any other powder. The use of the material powder according to this embodiment enables production of an article excellent in mechanical strength. The powder according to this embodiment is suitable for manufacture of, for example, a ceramic component that requires mechanical strength, for example, a machine component, a mold for plastic, a dental component such as a denture material, or an aerospace component such as a turbine material.

In the powder for ceramic shaping according to this embodiment, the oxide particles each contain at least Zr, Y, Si, and optionally Al. Y (yttrium) is preferably contained as an oxide. In particular, $ZrO_2$ preferably contains Y as $Y_2O_3$ (yttrium oxide, yttria)-stabilized $ZrO_2$. The content of $Y_2O_3$ in $ZrO_2$ is preferably 1.5 mol % or more and 10.5 mol % or less, more preferably 2.0 mol % or more and 4.5 mol % or less. In addition, Y may be present as an oxide formed of Si and Y. With such configuration, in an intermediate shaped object formed of the powder for ceramic shaping, cracks can be self-repaired through heating. $ZrO_2$ containing $Y_2O_3$ is also referred to as "YSZ" (Yttria Stabilized Zirconia, yttria-stabilized zirconia, or yttrium-stabilized zirconia). In this embodiment, $ZrO_2$ containing $Y_2O_3$ in which the addition concentration of $Y_2O_3$ is 3 mol % with respect to $ZrO_2$ is also referred to as "3YSZ", and $ZrO_2$ containing $Y_2O_3$ in which the addition concentration of $Y_2O_3$ is 4 mol % with respect to $ZrO_2$ is also referred to as "4YSZ". In the present disclosure, Si, which is a semimetal element, is treated as one of metal elements.

Further, in the powder for ceramic shaping according to this embodiment, when a content of Zr is converted into a mass of $ZrO_2$, a content of Y is converted into a mass of $Y_2O_3$, a content of Si is converted into a mass of $SiO_2$, and a content of Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions: $77.64 \leq \alpha \leq 93.06$; $4.42 \leq \beta \leq 6.49$; and $0.72 \leq \gamma \leq 17.29$. With regard to the composition range γ in terms of $SiO_2$, the lower limit value is a value which is advantageous in maintaining the crack self-repairing property of a ceramic shaped object (oxide structural body) to be obtained in this embodiment, and is further a value with which a function as a laser absorber is sufficiently obtained in the case where Si is contained as SiO. An upper limit value is advantageous as one condition for satisfying a mechanical strength, particularly a three-point flexural strength value of 50 MPa or more. A three-point flexural strength value is more preferably 100 MPa or more, still more preferably 150 MPa or more. The three-point flexural strength value may also be set to 200 MPa or more. The three-point flexural strength value may be 1,000 MPa or less, 500 MPa or less, or 400 MPa or less.

Further, in the powder for ceramic shaping according to this embodiment, the oxide particles each preferably contain Al. It is more preferred that, in the composition of the powder for ceramic shaping, when the mass of $Al_2O_3$ with respect to the total amount of the mass of $ZrO_2$, the mass of $Y_2O_3$, the mass of $SiO_2$, and the mass of $Al_2O_3$ is represented by δ (mass %), δ satisfy the following expression: $0.21 \leq \delta \leq 89.17$.

The oxide particles may contain alumina particles or may contain alumina-added yttria-stabilized zirconia particles. YSZ containing Al in which the addition concentration of $Y_2O_3$ is 3 mol % with respect to $ZrO_2$ is hereinafter also referred to as "3YSZ(Al)".

An indication of a compound, such as $ZrO_2$, $SiO_2$, SiO, $Y_2O_3$, or $Al_2O_3$, does not limit composition of an indicated stoichiometric ratio, and an error in constituent element ratio of within ±30% from a stoichiometric ratio normalized with a metal element is tolerated. For example, a compound having a constituent element ratio of Si:O=1:1.30 is also encompassed by the indication of SiO. That is, SiO may be represented as $SiO_m$ ($0.75 \leq m \leq 1.3$).

The powder for ceramic shaping of this embodiment contains at least silicon monoxide (SiO) particles. SiO shows a brown color or a black color, and has a relatively high light-absorbing ability for light (laser light) at a wavelength to be radiated in shaping as compared to YSZ or $SiO_2$ contained in the powder for ceramic shaping. When SiO absorbs laser light, Si changes its form from divalent to tetravalent, changing from SiO in a metastable state to $SiO_2$ in a more stable state to have a lower light-absorbing ability for laser light. When shaping is performed through use of a powder in which SiO having a characteristic as described above is added as an absorber to YSZ and silicon dioxide ($SiO_2$), the following actions and effects can be obtained.

The first action and effect is that SiO serving as an absorber is increased in temperature by efficiently absorbing laser light to be used in manufacturing, and thus transfers heat to any other compound present in a region corresponding to the focal point size of the laser light, to thereby cause a temperature increase. As a result, local heating corresponding to the focal point size of the laser light can be effectively achieved, and an interface between a region in which a powder is to be solidified (region that has been irradiated with the laser light) and a region in which the powder is not to be solidified (region that has not been irradiated with the laser light) can be made distinct to improve shaping accuracy.

The second action and effect is that SiO changes into $SiO_2$ having a low light-absorbing ability through irradiation with laser light, and absorption of light is suppressed in a portion (solidified portion) which has been irradiated with the laser light once and in which the powder has been solidified. In a case where the light-absorbing ability of $SiO_x$ is reduced to 5/6 times or less as high as the light-absorbing ability of SiO before irradiation with laser light, even when the solidified portion is irradiated with laser light under the same conditions as those at the time of its solidification, the portion is not so influenced that the shaping accuracy is reduced. That is, almost no absorber is present in the solidified portion, and hence such a temperature increase as in a case before irradiation with laser light does not occur. Even when the powder adjacent to the solidified portion is irradiated with laser light, deformation and alternation of the solidified portion are suppressed. As a result, a process margin for laser light irradiation conditions, etc. can be increased, and the influence of fluctuation in irradiation conditions on the shaping accuracy can be reduced. In order to obtain sufficient shaping accuracy, a light-absorbing ability of SiO alone before irradiation with laser light preferably differs from a light-absorbing ability of an absorber changed in composition after an irradiation with laser light by 1.2 times or more, more preferably differs therefrom by 2 times or more. As described above, when shaping is performed by selectively irradiating the powder according to this embodiment with laser light, the above-mentioned first action and effect and second action and effect are obtained, and thus shaping with high accuracy can be achieved. In addition, SiO is distributed in a market as a negative electrode for a lithium ion secondary battery, and hence can also be procured inexpensively as compared to any other compound that can be utilized as an absorber.

In the powder for ceramic shaping of this embodiment, with regard to SiO, which functions as an infrared absorber, a content of the silicon monoxide particles in oxide particles is preferably 0.5 vol % or more and 53 vol % or less, more preferably 0.5 vol % or more and 10 vol % or less. The volume composition was calculated, for example, from a mass through use of a true density. The following densities were used as true densities: $ZrO_2$: 5.68 [g/cm$^3$]; $Y_2O_3$: 5.01 [g/cm$^3$]; $SiO_2$: 2.30 [g/cm$^3$]; $Al_2O_3$: 3.96 [g/cm$^3$]; and SiO: 2.13 [g/cm$^3$]. Even when the true density is a slightly different value, an essence of this embodiment is not influenced.

Individual particles contained in the powder for ceramic shaping independent of one another may be a sintered product of a plurality of particles (sintered particles), and may be amorphous or crystalline. In this embodiment, a case in which the powder is formed of a plurality of compounds encompasses a case of a mixture of a plurality of kinds of particles each formed of one kind of compound, and a case of one kind, or a mixture of a plurality of kinds, of particles each formed of a plurality of kinds of compounds. For an avoidance of confusion, the particles contained in the powder independent of one another are hereinafter simply referred to as "particles", and particles for forming the individual particles are hereinafter referred to as "constituent particles". For example, when the powder is formed of sintered particles in which $ZrO_2$ particles and $Y_2O_3$ particles are sintered, the sintered particles are referred to as "particles", and the $ZrO_2$ particles and the $Y_2O_3$ particles for forming the sintered particles are each referred to as "constituent particles".

As an example in which particles for forming the powder for ceramic shaping each contain one kind of compound, in the case of a powder for ceramic shaping containing Zr, Y, and Si as elements, there is given, for example, a state in which the powder for ceramic shaping is configured as a mixture of three kinds of particles, that is, $ZrO_2$ particles, $Y_2O_3$ particles, and $SiO_2$ particles, and SiO particles.

As an example in which particles for forming the powder for ceramic shaping each contain a plurality of compounds, there are given, for example, a state in which one particle is formed of a $ZrO_2$ region, an $Y_2O_3$ region, and a $SiO_2$ region, and a state in which particles each formed of a $ZrO_2$ region and an $Y_2O_3$ region and particles each formed of $SiO_2$ are contained. YSZ, in which $Y_2O_3$ is solid solved in $ZrO_2$, may be considered as a single compound. However, YSZ containing $Al_2O_3$, which is also represented as YSZ(Al) in this embodiment, is considered as an example of containing a plurality of compounds, such as YSZ and $Al_2O_3$.

Accordingly, a preferred example of the powder for ceramic shaping of this embodiment is formed of 3YSZ particles, $SiO_2$ particles, and SiO particles, or 3YSZ(Al) particles, $SiO_2$ particles, SiO particles, and $Al_2O_3$ particles.

In a situation where a powder bed layer is formed with a recoater in powder bed fusion, or in a situation where a powder is jetted from a nozzle in a cladding method, it is important that the powder for ceramic shaping have fluidity which is appropriate therefor. Accordingly, the powder for ceramic shaping according to this embodiment preferably satisfies a fluidity index of 40 [sec/50 g] or less. In order to ensure such fluidity, the particles each preferably have a spherical shape. However, as long as the above-mentioned fluidity index can be satisfied, the shapes of the particles are not limited to spherical shapes. The fluidity index may be measured, for example, in conformity with JIS Z2502.

SiO, which functions as an absorber, is particularly preferably in a state of being contained in the powder for ceramic shaping as particles (SiO particles) independent of any other component whatever state the other compound is contained therein is in. SiO can achieve a higher light-absorbing ability in such state than in a state of being contained in one particle together with the other compound. Further, laser light can easily reach the absorber to enable efficient utilization of the light-absorbing ability of the absorber. Besides, when SiO serves as particles which are independent of the other component, the particle size of the SiO particles and the particle size of other particles can be separately adjusted. Thus, the fluidity of the powder is easily controlled, and an amount of the absorber present in a spot diameter of the laser light to be radiated is easily controlled. This point is described in detail later. In order that particles each containing SiO and the other compound may function as an absorber, the content of SiO in the particles is preferably 50 vol % or less.

When the silicon monoxide (SiO) particles do not contain a region except for silicon monoxide, it is preferred that an average particle size of particles except for the SiO particles out of the oxide particles (hereinafter also referred to as "base material particles") is 5 μm or more, and be larger than the average particle size of the SiO particles from a viewpoint of achieving preferred fluidity. It is more preferred that an average particle size of the base material particles is 5 μm or more, and is 5 times or more as large as that of the SiO particles. In addition, it is more preferred that the average particle size of the base material particles is 10 μm or more and 200 μm or less, and is larger than the average particle size of the SiO particles. It is still more preferred that the average particle size of the base material particles be 10 μm or more and 200 μm or less, and is 5 times or more as large as the average particle size of the SiO particles. In addition, from a viewpoint of achieving high shaping accuracy, and a viewpoint of facilitating a sintering or a melting of the powder, the average particle size of the base material particles is preferably 200 μm or less, more preferably 150 μm or less.

When the silicon monoxide (SiO) particles each do not contain a region except for silicon monoxide, it is preferred that an average particle size of the SiO particles is 10 μm or less, and be ⅕ or less of the average particle size of the base material particles. When the SiO particles satisfy such conditions, a probability that a plurality of SiO particles are dispersed and present in a vicinity of base material particles becomes higher, and hence heat generated through absorption of laser light by SiO is efficiently transferred to the base material particles to facilitate the melting of the powder in a laser light irradiation portion. In consideration of achievement of the dispersibility and high packing density of SiO in the powder for ceramic shaping, the average particle size of the SiO particles is preferably as small as possible. Meanwhile, when the average particle size of the SiO particles is 1 μm or more, scattering of the particles into an atmosphere through irradiation with laser light is suppressed, and hence a suitable amount thereof as the absorber can be maintained in the powder for ceramic shaping. Accordingly, it is preferred that the average particle size of the SiO particles is 1 μm or more and 10 μm or less, and is ⅕ or less of the average particle size of the base material particles. It is more preferred that the average particle size of the SiO particles is 1 μm or more and less than 5 μm, and is ⅕ or less of the average particle size of the base material particles.

When the silicon monoxide (SiO) particles each include a region except for silicon monoxide, the average particle size thereof is preferably 5 μm or more and 200 μm or less from a viewpoint of achieving fluidity suitable for additive manufacturing. It is more preferred that the average particle size is 5 μm or more, and is 5 times or more as large as the average diameter of a region formed of SiO included in each of the particles. It is still more preferred that the average particle size is 10 μm or more, and is 5 times or more as large as an average diameter of the region formed of SiO. From a viewpoint of achieving high shaping accuracy, and a viewpoint of facilitating the sintering or melting of the powder, when the silicon monoxide (SiO) particles each include the region except for silicon monoxide, the average particle size of the silicon monoxide particles is preferably 200 μm or less, more preferably 150 μm or less.

In particles each containing SiO and a compound except for SiO, the average particle size of constituent particles each formed of SiO is obtained by observing the powder, for example, with a scanning electron microscope (SEM) to measure the areas of regions each formed of SiO, and calculating the circle equivalent diameters of the areas. A plurality of (100 or more) regions each formed of SiO are subjected to the measurement, and their median is adopted as the average particle size of the constituent particles each formed of SiO.

The particle size in this embodiment refers to a circle equivalent diameter (Heywood diameter) of each individual particle. The average particle size of particles each formed of specific composition contained in the powder for ceramic shaping does not refer to the particle sizes of the individual particles, but is the median of a group of particles having the same composition, and does not mean that no particle having a size except for that described as the average particle size is contained in the powder.

The average particle size of the particles may be calculated by the following method in the same manner as in the case of the average particle size of the constituent particles. The powder is observed, for example, with a scanning electron microscope (SEM). Areas of particles therein each having specific composition, for which the average particle size is to be calculated, are measured, and the circle equivalent diameters of the areas are calculated. The calculation method for the average particle size may be applied irrespective of a state of the particles.

It is preferred that an average particle size of the $SiO_2$ particles contained in $SiO_2$ powder is 5 μm or more, and is larger than that of the SiO particles from a viewpoint of achieving preferred fluidity. It is more preferred that the average particle size of the $SiO_2$ particles is 5 μm or more, or is 5 times or more as large as the average particle size of the SiO particles. It is still more preferred that the average particle size of the $SiO_2$ particles is 10 μm or more, or is 5 times or more as large as the average particle size of the SiO particles. In addition, from a viewpoint of achieving high shaping accuracy, and a viewpoint of facilitating the sintering or melting of the powder, an average particle size of the base material particles is preferably 200 μm or less, more preferably 150 μm or less. Meanwhile, $SiO_2$ has high viscosity in melting. Accordingly, when the powder for ceramic shaping contains $SiO_2$ having a large particle size in a large amount, the $SiO_2$ is liable to become a spherical shape in a molten state to be solidified as it is, and hence a porous shaped object is liable to be formed. In order to manufacture a dense ceramic shaped object, the average particle size is preferably 100 μm or less, more preferably 50 μm or less.

The powder for ceramic shaping according to this embodiment preferably does not contain a resin binder. This is because the resin binder has a markedly low melting point as compared to the other compounds contained in the powder, and hence may explosively burn up through irradiation with laser light to cause a void or a defect to be present in a shaped region.

In addition, when the powder contains elemental carbon having sublimability, carbon is bonded to oxygen to escape as a gas, and hence a volume that has been occupied by carbon element may become a void. Further, carbon element may sublimate through irradiation with laser light to rapidly gasify, to thereby adversely influence shaping. Specifically, rapid gasification may apply a stress to a portion in which the powder for ceramic shaping has been melted or the solidified portion, leading to a deformed shaped object. Accordingly, it is preferred that the powder basically does not contain elemental carbon. Even when an amount of carbon element contained in the powder is not completely 0, the amount of carbon element is preferably small, and is particularly preferably 1,000 ppm or less in terms of molar ratio with respect to metal elements of a plurality of compounds contained in the powder.

The powder for ceramic shaping according to this embodiment is not limited as to, for example, whether the powder for ceramic shaping is in a crystalline or amorphous state, or a mixture thereof. In addition, the powder and the manufactured ceramic shaped object do not need to be completely identical to each other in composition, and may be different from each other particularly in, for example, oxidation state or nitridation state.

Second Embodiment

The second embodiment is directed to a method of manufacturing a ceramic shaped object.

The method of manufacturing a ceramic shaped object of this embodiment is a method of manufacturing a ceramic shaped object including: a placement step of placing oxide particles on a base; an irradiation step of irradiating part or a whole of the oxide particles with laser light to melt and solidify the oxide particles at a site irradiated with the laser light, to thereby provide an intermediate shaped object; and a heating step of subjecting the intermediate shaped object to heat treatment, wherein the oxide particles each contain a plurality of kinds of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, and the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions.

$$77.64 \leq \alpha \leq 93.06$$

$$4.42 \leq \beta \leq 6.49$$

$$0.72 \leq \gamma \leq 17.29$$

The items are described below. The substances are as described above, and hence description thereof may be omitted.

(Placement Step and Irradiation Step)

The powder for ceramic shaping of this embodiment is suitably used in an additive manufacturing method involving performing shaping through irradiation of the powder for ceramic shaping with laser light in accordance with slice data generated based on three-dimensional data on a ceramic shaped object to be manufactured. Specifically, the powder for ceramic shaping is used in a manufacturing method using powder bed fusion or a cladding method. The manufacturing process includes manufacturing a ceramic shaped object by alternately performing the placement step and the irradiation step described below a plurality of times.

The method of manufacturing a ceramic shaped object of this embodiment includes: a placement step of placing oxide particles on a base; and an irradiation step of irradiating part or the whole of the oxide particles with laser light to melt and solidify oxide particles at a site irradiated with the laser light, to thereby provide an intermediate shaped object.

When the shaping is performed by using powder bed fusion, the placement step and the irradiation step are performed by: spreading and leveling the powder for ceramic shaping of this embodiment on the base so as to have a predetermined thickness; and then irradiating the powder with the laser light. When the shaping is performed by using the cladding method, the placement step and the irradiation step are performed by: jetting the powder for ceramic shaping of this embodiment to a predetermined site; and irradiating the predetermined site with the laser light.

In the method of manufacturing a ceramic shaped object according to this embodiment, with regard to the powder for ceramic shaping, when a content of Zr is converted into a mass of $ZrO_2$, a content of Y is converted into a mass of $Y_2O_3$, a content of Si is converted into a mass of $SiO_2$, and a content of Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy the following expressions: $77.64 \leq \alpha \leq 93.06$; $4.42 \leq \beta \leq 6.49$; and $0.72 \leq \gamma \leq 17.29$. With regard to a composition range γ in terms of $SiO_2$, the lower limit value is a value advantageous in maintaining a crack self-repairing property of a ceramic shaped object (oxide structural body) to be obtained in this embodiment, and is further a value with which a function as a laser absorber is sufficiently obtained in the case where Si is contained as SiO. The upper limit value is advantageous as one condition for satisfying a mechanical strength, particularly a three-point flexural strength value of 50 MPa or more. The three-point flexural strength value is more preferably 100 MPa or more, still more preferably 150 MPa or more. The three-point flexural strength value may also be set to 200 MPa or more. The three-point flexural strength value may be 1,000 MPa or less, 500 MPa or less, or 400 MPa or less.

In the method of manufacturing a ceramic shaped object according to this embodiment, it is preferred that the oxide particles each contain Al, and when the mass of $Al_2O_3$ with respect to a total amount of the mass of $ZrO_2$, the mass of $Y_2O_3$, the mass of $SiO_2$, and the mass of $Al_2O_3$ is represented by δ (mass %), δ satisfy the following expression: $0.21 \leq \delta \leq 9.17$.

The wavelength of the laser light to be used in the shaping is not limited, but the laser light adjusted to a desired focal point size, such as a diameter from 10 μm to 2 mm, in a lens or a fiber, is preferably used. The focal point size is one of the parameters that influence the shaping accuracy, and in order to satisfy a shaping accuracy of 100 μm (0.1 mm), in some cases, a line width is preferably comparable thereto, and the focal point size is preferably 100 μm or less in diameter. The irradiation with the laser light is not limited as to being continuous or pulsed. For the laser light, there may be suitably used, for example, a laser having a wavelength in a vicinity of 1,000 nm, such as a Nd:YAG laser or a Yb fiber laser. This is because a SiO component shows a particularly high absorbing ability for light at a wavelength of about 1 μm.

FIG. 1(*a*) to FIG. 1(*h*) are conceptual views of a three-dimensional shaping apparatus using powder bed fusion (infrared laser melting method). A basic flow of shaping by a manufacturing method using an infrared laser melting method in which the powder for ceramic shaping of this embodiment can be used is described with reference to the schematic views of FIG. 1(*a*) to FIG. 1(*h*).

As illustrated in FIG. 1(*a*), first, a raw material powder 301 is placed on a base 330 set to a stage 351, and is spread and leveled with a roller 352 so as to have a predetermined thickness. Thus, as illustrated in FIG. 1(*b*), a powder layer 302 is formed. As illustrated in FIG. 1(*c*), the powder layer 302 is irradiated with a laser beam emitted from a laser light source 380 based on slice data generated from geometric data on a desired three-dimensional model while being scanned with a scanner unit 381. In a laser beam irradiation range, the raw material powder is melted and then solidified, and thus a solidified portion 300 corresponding to slice data of one layer is formed. Subsequently, as illustrated in FIG. 1(*d*), the stage 351 is lowered, and a new powder layer 302 is formed on the solidified portion 300. As illustrated in FIG. 1(*e*), the powder layer 302 is irradiated with a laser beam based on the slice data. As illustrated in FIG. 1(*f*), a series of those steps is repeated by a number of times corresponding to the slice data, to thereby provide a shaped object 310. Finally, as illustrated in FIG. 1(*g*), an unsolidified raw material powder 303 is removed, and as illustrated in FIG. 1(*h*), an unnecessary portion of the shaped object is removed or the shaped object 310 and the base 330 are separated from each other as required. Further, after that, heat treatment may be performed as required.

Figure 6:
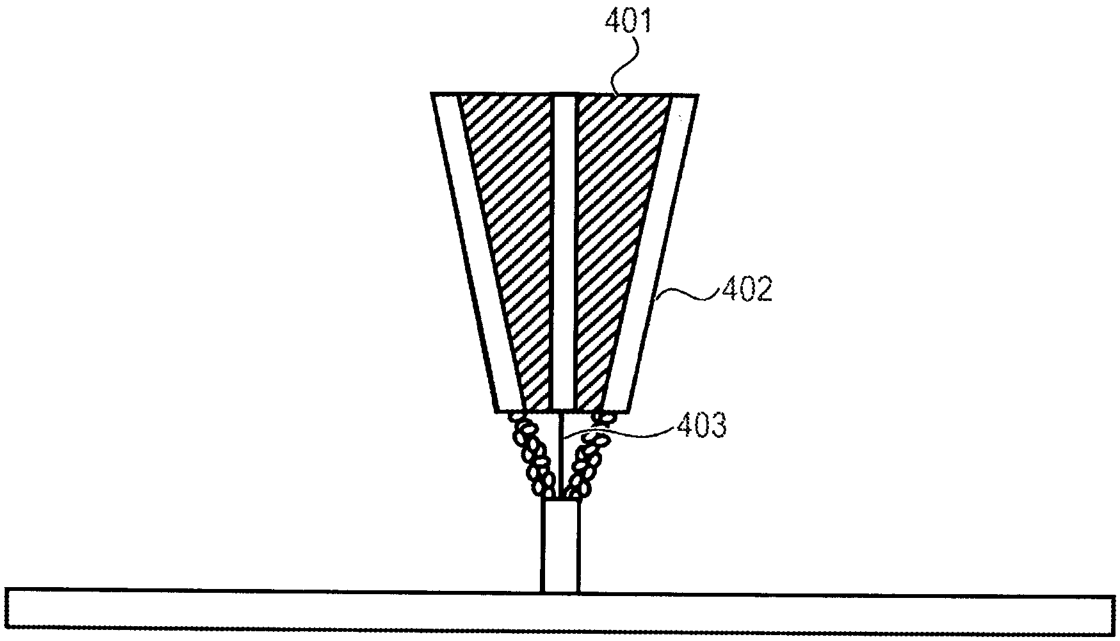
FIG. 6 is a schematic view for illustrating another example of the method of manufacturing a ceramic shaped object of this embodiment.

A cladding system is described with reference to FIG. 6. The cladding system is a technique involving jetting a powder from each of a plurality of powder supply holes 402 in a cladding nozzle 401, and irradiating a region in which the respective powders are focused with laser light 403, to thereby sequentially manufacture a ceramic shaped object at a desired site. The cladding system has a feature in that shaping can be performed on a curved surface or the like.

In addition, in the manufacturing process, an atmosphere may be controlled. In the manufacturing process, not only the air atmosphere, but also an inert atmosphere containing nitrogen or another inert gas such as a noble gas, an atmosphere in which compounds contained in the powder for ceramic shaping are easily reduced, such as an atmosphere containing hydrogen and a reduced-pressure atmosphere, or an oxygen atmosphere is also preferably adopted. When such control of the atmosphere is performed, a powder containing a compound in a state of being oxidized or reduced from the stoichiometric ratio can be used in the manufacture of a ceramic shaped object.

In such manufacturing process of this embodiment as described above, a use of the powder for ceramic shaping according to this embodiment enables stable shaping, and can provide a ceramic shaped object in which shaping accuracy is secured.

The ceramic shaped object to be manufactured by using the powder for ceramic shaping according to this embodiment is not limited to one made of an inorganic material in a crystalline state. As long as desired physical property values are obtained, a part or more than a half of the ceramic shaped object may be in an amorphous state. In addition, through the above-mentioned manufacturing process, a ceramic shaped object containing, for example, a region close to a metal state resulting from reduction of the powder for ceramic shaping may be manufactured.

(Impregnation Step)

The method of manufacturing a ceramic shaped object of this embodiment may include, after the irradiation step and before the heating step, an impregnation step of impregnating the intermediate shaped object with a metal component-containing liquid.

In manufacturing the intermediate shaped object using the infrared laser melting method, the raw material powder is melted through irradiation with infrared laser, and is then solidified. In order to maintain productivity during shape fabrication, it is preferred to increase the scanning speed of the laser. In this case, a portion having been irradiated with the laser is rapidly cooled during solidification. As a result, many fine cracks occur in the intermediate shaped object of the ceramic shaped object suffered from a thermal stress caused by rapid cooling.

The manufacture of the ceramic shaped object may be completed through a heat treatment step while the cracks are left as they are. However, it is also preferred to make use of the presence of the fine cracks, and impregnate the crack portions with a modifier for function modification. For example, the intermediate shaped object may be impregnated with Li, Na, K, Mg, Ca, Y, Al, Ti, Zr, Hf, Si, etc. through use of a metal component-containing liquid, followed by drying or fixation at 600° C. or less. The metal component-containing liquid preferably contains at least one metal component selected from the group consisting of Li, Na, K, Ca, Y, Al, Zr, and Si, and more preferably contains Al as the metal component. With this configuration, the three-point flexural strength of the ceramic shaped object can be further increased. A fixation amount to cracks may be controlled by the concentration of the metal component-containing liquid or the number of times of impregnation. Accordingly, the modifier can be fixed to a crack wall surface or between crack walls through this step.

In this embodiment, the mechanical strength of the shaped object can be increased by impregnating microcracks of the intermediate shaped object with the metal component-containing liquid, and heating the intermediate shaped object at a temperature at which the microcracks can be repaired, to thereby modify microcrack portions.

An example of the effect exhibited by the impregnation with the metal component is that a metal element component, which has traveled through the microcrack portions of the intermediate shaped object and which has been distributed throughout the intermediate shaped object, is diffused over a wide range of a crystal for forming the intermediate shaped object, and that the crystal is recrystallized with composition containing the metal element component through heating. Thus, a binding force between crystal structures, such as a grain boundary of the intermediate shaped object, is increased, and the abrasion resistance of the shaped object is improved. The grain boundary refers to a boundary between crystal grains. The crystal grain is sometimes described simply as “grain”.

Another example thereof is that the intermediate shaped object is formed of a crystalline structure or an amorphous structure formed through irradiation with an energy beam. In the heating step, it is preferred that the recrystallization is performed under the state in which the metal element component is diffused into the crystalline structure or the amorphous structure. It is also preferred that the amorphous structure change into an amorphous structure having higher strength. Accordingly, grains for forming a phase originally included in the intermediate shaped object and grains for forming a phase containing the metal element component before heating differ from each other in particle size (e.g., average particle size) after heating. As described above, a phase separated structure formed of a plurality of phases that differ from each other in average particle size of constituent grains is formed, and thus the machinability of the shaped object is improved, and accurate finishing with less chipping can be achieved.

Accordingly, this embodiment is characterized by modification of the intermediate shaped object obtained by melting and solidifying the powder with an energy beam, through introduction of the metal element component. Even when the powder before melting contains the metal element component, innumerable microcracks are formed in the intermediate shaped object suffered from a thermal stress caused by a temperature difference between melting and solidification. However, preliminary incorporation of the same metal component as another effect is permitted.

As described above, when the step of this embodiment is performed, modification is achieved during repairing of the microcracks in the heat treatment step described next. Thus, for example, the mechanical strength of the shaped object can be increased.

(Heating Step)

The method of manufacturing a ceramic shaped object of this embodiment includes the heating step of subjecting the intermediate shaped object to heat treatment.

The powder having been melted through irradiation with an energy beam such as laser light is cooled by emitting heat to the periphery to be solidified. Thus, the intermediate shaped object is formed.

In a case of ceramics, the thermal diffusivity of a ceramic is lower than that of a metal, etc., and hence a temperature difference between a temperature of a site having been melted and a temperature of its periphery is relatively increased. Accordingly, when the shaping is performed by an infrared laser melting method without residual heat at high temperature, many microcracks occur in the intermediate shaped object. The microcracks are distributed throughout (on a surface and in an inside of) the intermediate shaped object. When a cross-section of the intermediate shaped object is observed, for example, with a scanning electron microscope, most of the microcracks have a width from several nanometers to several micrometers. In addition, the microcracks have various lengths from several micrometers to several millimeters.

When the microcracks are formed in the intermediate shaped object, in the case where a stress is applied to the shaped object, the stress is concentrated in a vicinity of the cracks, and hence the mechanical strength of the shaped object is reduced as compared to that of a material in a bulk state. Accordingly, it is preferred that the microcracks be repaired in some way.

As an example of this embodiment, it has been found that when a powder for ceramic shaping formed of YSZ particles, $SiO_2$ particles, and SiO particles is subjected to layer manufacturing, microcracks are self-repaired in a firing step after shaping. In an inside of an intermediate shaped object formed by an additive manufacturing method involving performing shaping through irradiation of the powder for ceramic shaping with laser light, a region containing silicon oxide as a main component is locally formed. In a heat treatment step to be performed after the formation of the intermediate shaped object, the region is melted through heat treatment to penetrate through the microcracks and fill the insides of the microcracks, and thus the cracks are repaired. In this case, a heat treatment temperature may be 1,690° C. or more, and preferably falls within the range of 1,690° C. or more and 1,790° C. or less. Depending on the metal component of the previous step of impregnating the intermediate shaped object with a metal component-containing liquid, the effect of this embodiment can be obtained even by selecting an appropriate temperature of 1,690° C. or less at which the microcracks can be repaired.

In order to repair the cracks, it is important that a repairing material of a repairing material source is melted through heat treatment to seep out from the repairing material source into the cracks by a capillary phenomenon, and hence Si is preferably contained at 0.72 wt % or more in terms of $SiO_2$ in the powder for ceramic shaping to be used in layer manufacturing. This is because when an amount of Si is smaller, the repairing material cannot ensure a volume enough to seep out into cracks and backfill the cracks. In addition, a cavity is generated in the repairing material source in order to backfill the cracks in some cases, but no problem arises even in such cases as long as strength is ensured as a whole. When SiO, which functions as a laser light absorber, absorbs laser light, Si changes its form from divalent to tetravalent, changing from SiO in a metastable state to $SiO_2$ in a more stable state. Accordingly, an addition amount of $SiO_2$ powder appropriate for repairing the cracks is a total of an addition amount of $SiO_2$ powder and an addition amount of SiO powder.

Further, the $ZrO_2$ particles and the $SiO_2$ particles to be used in this embodiment each have a lower thermal conductivity coefficient than that of the $Al_2O_3$ particles, which are a general fine ceramic material. Accordingly, it takes a considerable amount of time when heat diffusion occurs inside the particles through heat transfer from the SiO particles having been heated by laser light, and a center temperature reaches a melting point. From this viewpoint, an average particle size is preferably 100 μm or less, more preferably 50 μm or less.

In the method of manufacturing a ceramic shaped object of this embodiment, the three-point flexural strength of the ceramic shaped object described later is preferably 50 MPa or more, more preferably 100 MPa or more, still more preferably 150 MPa or more. The three-point flexural strength value may also be set to 200 MPa or more. With such configuration, a ceramic shaped object having higher material strength can be manufactured. The three-point flexural strength value may be 1,000 MPa or less, 500 MPa or less, or 400 MPa or less.

Third Embodiment

The third embodiment is directed to a ceramic shaped object. The ceramic shaped object of this embodiment includes a portion formed of oxides of a plurality of kinds of elements including at least Zr, Y, Si, and optionally Al within the range of L×M×L (1 μm≤L≤1 mm, 1 μm≤M≤1 mm). When a content of the Zr in the portion is converted into a mass of $ZrO_2$, a content of the Y in the portion is converted into a mass of $Y_2O_3$, a content of the Si in the portion is converted into a mass of $SiO_2$, and a content of the Al in the portion is converted into a mass of $Al_2O_3$, and the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by "α'" (mass %), "β'" (mass %), and "γ'" (mass %), respectively, "α'", "β'", and "γ'" satisfy the following expressions.

$$77.6 \leq \alpha' \leq 93.5$$

$$4.4 \leq \beta' \leq 6.5$$

$$0.4 \leq \gamma' \leq 17.3$$

In the ceramic shaped object of the present disclosure, it is preferred that when the mass of $Al_2O_3$ with respect to the total amount of the mass of $ZrO_2$, the mass of $Y_2O_3$, the mass of $SiO_2$, and the mass of $Al_2O_3$ is represented by "δ'" (mass %), "δ'" satisfy the following expression.

$$0.2 \leq \delta' \leq 8.3$$

The description of the ranges of "α'", "β'", "γ'", and "δ'" is the same as that of the ranges of α, β, γ, and δ, and is hence omitted. The ceramic shaped object of this embodiment has a three-point flexural strength of preferably 50 MPa or more, more preferably 100 MPa or more, still more preferably 150 MPa or more. The three-point flexural strength value may also be set to 200 MPa or more. Thus, a ceramic shaped object having higher strength is obtained. The three-point flexural strength value may be 1,000 MPa or less, 500 MPa or less, or 400 MPa or less.

In addition, the ceramic shaped object of the present disclosure includes a portion formed of an oxide of a plurality of kinds of elements including at least Zr, Y, Si, and optionally Al within the range of L×M×L (1 μm≤L≤1 mm, 1 μm≤M≤1 mm), and the three-point flexural strength thereof may be 150 MPa or more.

Description is given below.

Figure 2A:
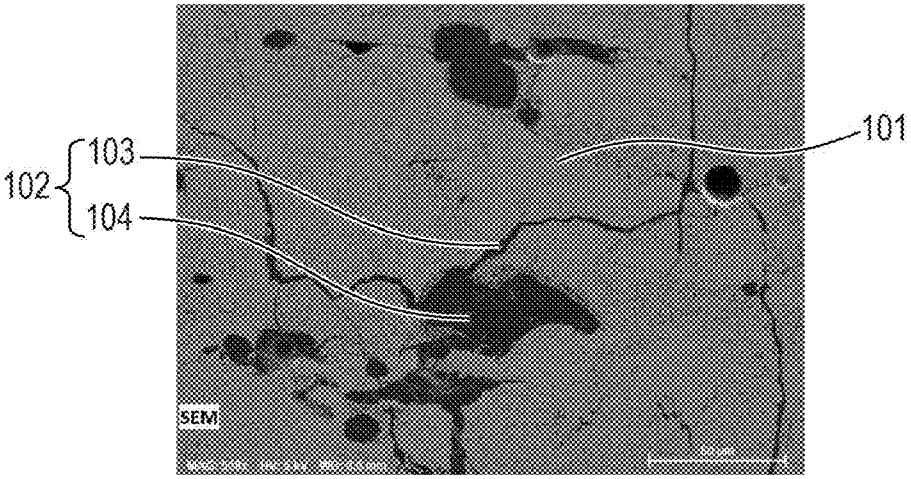
FIG. 2A is a SEM image of a cross-section showing an example of structural features of a ceramic shaped object of this embodiment.
Figure 2B:
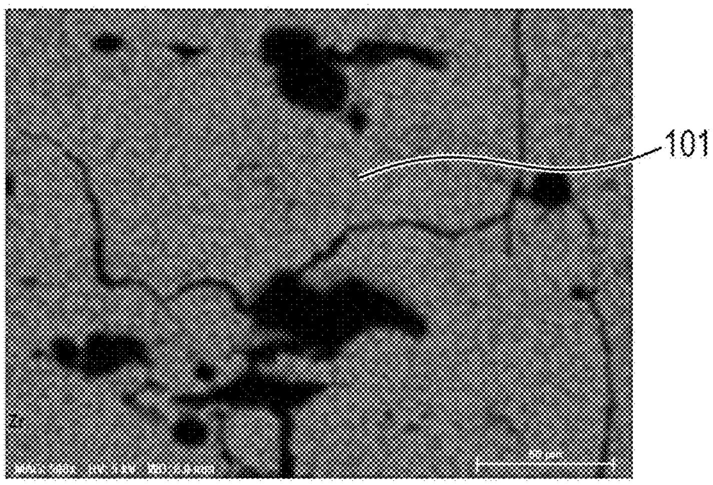
FIG. 2B is an elemental mapping image of Zr in the same field of view as in the SEM image of FIG. 2A.
Figure 2C:
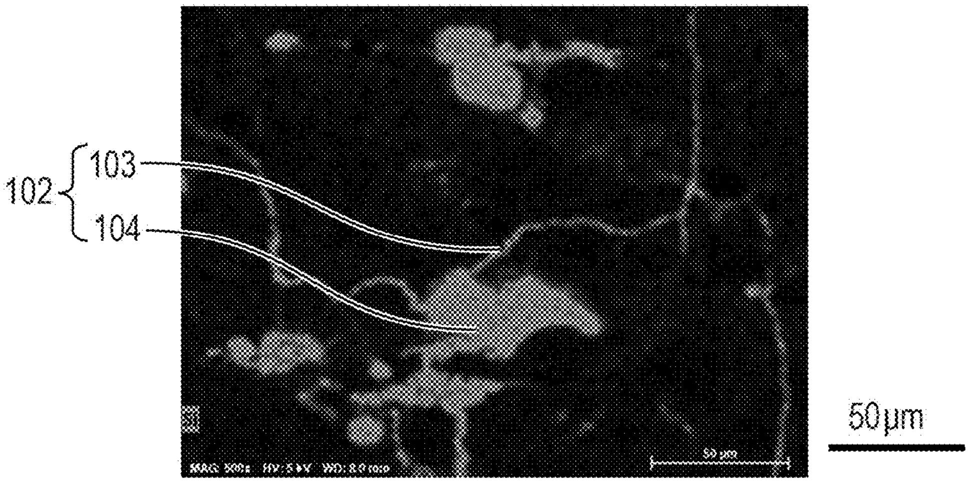
FIG. 2C is an elemental mapping image of Si in the same field of view as in the SEM image of FIG. 2A.

FIG. 2A to FIG. 2C are each a sectional explanatory view showing a state in which microcracks formed in an intermediate shaped object have been self-repaired after the firing step.

FIG. 2A is an example of a typical scanning electron microscope (SEM) image of a cross-section of a ceramic shaped object obtained after an intermediate shaped object produced by using the powder for ceramic shaping to be used in layer manufacturing of this embodiment (formed of 3YSZ(Al) particles, $SiO_2$ particles, and SiO particles) has been subjected to heat treatment at 1,730° C. Regions that appear bright in FIG. 2A are regions 101 (regions "z" in this embodiment) each containing Zr as a main component. Regions that appear dark in FIG. 2A are regions 102 each containing Si as a main component. The regions that appear dark include at least first regions 104 that are planar portions each having a ratio between a length and an average width of less than 10 and having an area of 78.5 $\mu m^2$ or more per portion (circle equivalent diameter of 10 μm or more), and second regions 103 (regions "s" in this embodiment) that are linear portions each having an average width of 1 μm or more and a ratio between a length and an average width of 10 or more. Thus, in a cross-section of the ceramic shaped object, the portion formed of oxides of a plurality of kinds of elements including at least Zr, Y, Si, and optionally Al preferably have regions "z", which each mainly contain Zr out of the plurality of kinds of elements, and regions "s", which are each positioned between a plurality of regions "z" and each mainly contain Si out of the plurality of kinds of elements. A region mainly containing a specific element out of a predetermined plurality of kinds of elements means that an element of the largest amount out of the predetermined plurality of kinds of elements that may be contained in the region is the specific element, and an element of the largest amount out of the elements to be contained in the region may be an element that does not correspond to any of the predetermined plurality of kinds of elements (e.g., oxygen). In a case of this embodiment, the predetermined plurality of kinds of elements may be an element group consisting of Zr, Y, Si, and Al.

FIG. 2B and FIG. 2C are each an element mapping image (energy dispersive X-ray spectroscopy (EDS)) using a scanning electron microscope, an image showing the distributions of Zr and Si. Regions that appear the brightest in FIG. 2B and appear the darkest in FIG. 2C are the regions 101 each containing Zr as a main component. Regions that appear the brightest in FIG. 2C and appear the darkest in FIG. 2B are the regions 102 each containing Si as a main component. The regions 102 include at least the first regions 104 that are planar portions each having a ratio between a length and an average width of less than 10 and having an area of 78.5 $\mu m^2$ or more per portion (circle equivalent diameter of 10 μm or more), and the second regions 103 that are linear portions each having an average width of 1 μm or more and a ratio between a length and an average width of 10 or more. The regions 102, 103, and 104 each contain Si as a main component and partially contain Zr, and this composition corresponds to eutectic composition in the equilibrium diagram of $ZrO_2$ and $SiO_2$. Y and Al contained in 3YSZ(Al) may be contained in the region containing Si as a main component.

It has been described that, in the heating step in the second embodiment, in order to repair the cracks, it is important that a repairing material of a repairing material source is melted through heat treatment to seep out from the repairing material source into the cracks by a capillary phenomenon. Here, the second regions 103 are each a portion in which the cracks have been repaired in the heating step in the second embodiment, and the first regions 104 are each the repairing material source when the cracks are repaired in the heating step in the second embodiment.

Figure 3A:
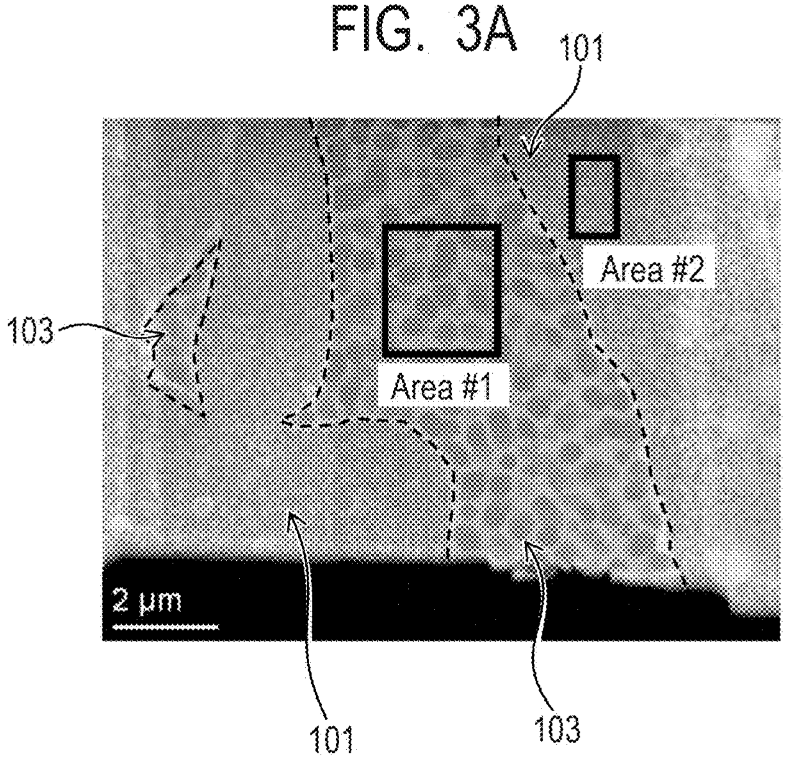
FIG. 3A is an image showing an example of a cross-section of the ceramic shaped object obtained in this embodiment.

FIG. 3A is an enlarged view of a cross-section of a shaped object. In FIG. 3A, there are a plurality of regions 101 and 103, and the boundaries therebetween are indicated by the broken lines. A typical example of the distributions of Zr, Y, Si, and Al in each of the regions is described below. Each of the regions may not contain at least any one of Zr, Y, Si, and Al. For example, Al may not be present in the region 101.

The region 101 typified by Area #2 in FIG. 3A is a base region. The region 101 contains Zr. The region 101 may contain Y in an amount per unit volume smaller than an amount of Zr per unit volume in the region 101. The region 101 may contain Al in an amount per unit volume smaller than the amount of Zr per unit volume in the region 101. An amount of Al per unit volume in the region 101 may be smaller than an amount of Y per unit volume in the region 101.

The region 103 typified by Area #1 in FIG. 3A is a crack-repaired region (region "s" in this embodiment). The region 103 contains Si. An amount of Si per unit volume in the region 103 may be larger than an amount of Si per unit volume in the region 101. The region 103 may contain Al. An amount of Al per unit volume in the region 103 may be larger than an amount of Al per unit volume in the region 101. The region 103 may contain Y. The amount of Al per unit volume in the region 103 may be smaller than the amount of Si per unit volume in the region 103. An amount of Y per unit volume in the region 103 may be smaller than an amount of Si per unit volume in the region 103. The amount of Y per unit volume in the region 103 may be larger or smaller than the amount of Al per unit volume in the region 103. An amount of Zr per unit volume in the region 103 may be smaller than an amount of Zr per unit volume in the region 101, and may be smaller than an amount of Si per unit volume, an amount of Al per unit volume, and an amount of Y per unit volume in the region 101. The region 103 may be an amorphous structure before and after the heating step of subjecting the intermediate shaped object to heat treatment, but the amorphous structure after the heating step may be an amorphous structure having strength higher than that of the amorphous structure before the heating step.

Figure 3B:
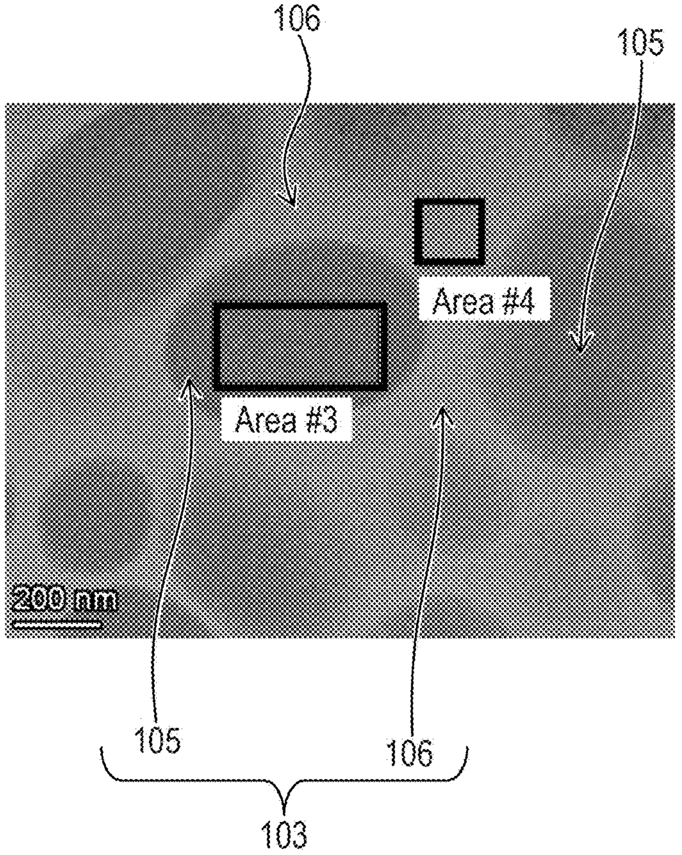
FIG. 3B is an image showing another example of a cross-section of the ceramic shaped object obtained in this embodiment.

FIG. 3B is an enlarged view of part of the region 103 (part of the region "s") in FIG. 3A. The region 103 has a plurality of island-like regions 105 (regions "r" in this embodiment) typified by Area #3 in FIG. 3B and a sea-like region 106 (region "t" in this embodiment) typified by Area #4 in FIG. 3B. The sea-like region 106 separates the plurality of island-like regions 105 from each other. In other words, the continuous sea-like region 106 is arranged between the plurality of island-like regions 105. It is preferred that the region "s" include the plurality of island-like regions 105 (regions "r") and the sea-like region 106 (region "t") that separates the plurality of island-like regions 105 (regions "r") from each other, and that the island-like regions 105 (regions "r") each mainly contain Si. The sea-like region 106 (region "t") preferably contains Al. The sea-like region 106 may also contain Si, but an amount of Si per unit volume in the sea-like region 106 may be smaller than an amount of Si per unit volume in the island-like regions 105. The amount of Si per unit volume in the sea-like region 106 may be smaller or larger than an amount of Al per unit volume in the sea-like region 106.

In addition, the island-like regions 105 may also each contain Al, but an amount of Al in the island-like regions 105 may be smaller than an amount of Al in the sea-like region 106. The amount of Al per unit volume in the island-like regions 105 may be smaller than an amount of Si per unit volume in the island-like regions 105. In addition, the sea-like region 106 may contain Y. An amount of Y per unit volume in the sea-like region 106 may be larger than an amount of Y per unit volume in the region 101. The island-like regions 105 may also each contain Y, but the amount of Y per unit volume in the island-like regions 105 may be smaller than the amount of Y per unit volume in the sea-like region 106.

The composition of the powder for ceramic shaping or the ceramic shaped object may be measured by Inductively Coupled Plasma Atomic Emission Spectroscopy (ICP-AES). It is only required that the measurement is performed with respect to the planar range of a quadrangle of M (μm)×N (μm) or the three-dimensional range of a quadrangular prism of L (μm)×M (μm)×N (μm). Here, L, M, and N are each, for example, 1 μm or more, 5 μm or more, 10 μm or more, 50 μm or more, or 100 μm or more, and 1,000 μm or less, or 500 μm or less. In FIG. 2A to FIG. 2C, and FIG. 3A and FIG. 3B, sectional structures each falling within the range of a quadrangular prism having the dimensions of the above-mentioned level are shown.

Fourth Embodiment

A fourth embodiment is directed to a ceramic shaped object. The ceramic shaped object of this embodiment is a ceramic shaped object including a plurality of kinds of elements including Zr and Si, wherein the ceramic shaped object includes a region mainly containing Zr and a region mainly containing Si, wherein at least the region mainly containing Si has a first region and a second region in a SEM image of a cross-section in a vicinity of a center of the ceramic shaped object, wherein the first region is a planar portion having a ratio between a length and an average width of less than 10 and having an area of 78.5 $\mu m^2$ or more per portion, and wherein the second region is a linear portion having an average width of 1 μm or more and having a ratio between a length and an average width of 10 or more, and is brought into contact with the first region.

As used herein, zirconium dioxide is sometimes described as zirconia or $ZrO_2$, silicon dioxide is sometimes described as silica or $SiO_2$, yttrium oxide is sometimes described as yttria or $Y_2O_3$, and aluminum oxide is sometimes described as alumina or $Al_2O_3$. Silicon dioxide has a plurality of different crystal forms, but is simply described as silicon dioxide or silica, or the chemical formula $SiO_2$ when a state, such as an amorphous state, a crystalline state, or a crystal structure, does not matter.

FIG. 2A is an example of a typical scanning electron microscope (SEM) image of a cross-section of a ceramic shaped object after heat treatment at 1,730° C., which is a ceramic shaped object 100 mainly containing Zr and Si produced by using a direct manufacturing system, and which contains $ZrO_2$ and $SiO_2$ as main oxides. As used herein, the typical scanning electron microscope (SEM) image of a cross-section of a ceramic shaped object refers to, for example, a SEM image of a cross-section in a vicinity of a center of the ceramic shaped object. Regions that appear bright in FIG. 2A are regions 101 each mainly containing Zr. Regions that appear dark in FIG. 2A are regions 102 each mainly containing Si. The regions 101 each mainly containing Zr and the regions 102 each mainly containing Si may be discriminated from each other by partial SEM-EDS measurement of the same SEM image or SEM-EDS mapping observation in the same field of view as in the SEM image.

A region mainly containing a specific element out of a predetermined plurality of kinds of elements means that an element in a largest amount out of a predetermined plurality of kinds of elements that may be contained in the region is a specific element, and the element in the largest amount of the elements to be contained in the region may be an element that does not correspond to any of the predetermined plurality of kinds of elements (e.g., oxygen). In a case of this embodiment, the predetermined plurality of kinds of elements may be an element group consisting of Zr, Y, Si, and Al.

Regions that appear dark include at least first regions 104 that are planar portions each having a ratio between a length and an average width of less than 10 and having an area of 78.5 $\mu m^2$ or more per portion (circle equivalent diameter of 10 μm or more), and second regions 103 that are linear portions each having an average width of 1 μm or more and a ratio between a length and an average width of 10 or more. The planar portion serving as the first region and the linear portion serving as the second region each merely refer to a shape (appearance) inside the SEM image observed by cross-sectional SEM observation, and do not refer to a three-dimensional structure inside the ceramic shaped object. In this embodiment, the ratio between a length and an average width refers to the ratio of the length to the average width, that is, "length/average width". Here, the length refers to a distance of each of the first region and the second region in its longitudinal direction, and the average width refers to an average of the distances thereof in a direction perpendicular to the longitudinal direction.

FIG. 2B and FIG. 2C are each an element mapping image (energy dispersive X-ray spectroscopy (EDS)) using a scanning electron microscope, the image showing distributions of Zr and Si. Regions that appear the brightest in FIG. 2B and appear the darkest in FIG. 2C are the regions 101 each mainly containing Zr. Regions that appear the brightest in FIG. 2C and appear the darkest in FIG. 2B are the regions 102 each mainly containing Si. The regions 102 include at least the first regions 104 that are planar portions each having a ratio between a length and an average width of less than 10 and having an area of 78.5 $\mu m^2$ or more per portion, and the second regions 103 that are linear portions each having an average width of 1 μm or more and a ratio between a length and an average width of 10 or more, and are brought into contact with the first regions 104. When the first regions each have a ratio between a length and an average width of less than 10 and have an area of 78.5 $\mu m^2$ or more per portion, the first regions can serve as storage regions for a substance mainly containing Si, and the ceramic shaped object can have the self-repairing property. When the first regions each have a ratio between a length and an average width of less than 10 and have an area of 78.5 $\mu m^2$ or more per portion, and the second regions each have an average width of 1 μm or more and a ratio between a length and an average width of 10 or more, the ceramic shaped object can have higher strength.

Figure 4A:
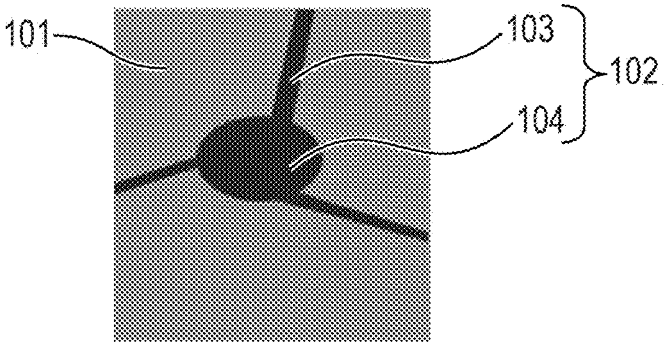
FIG. 4A is a view for schematically illustrating FIG. 2A.
Figure 4B:
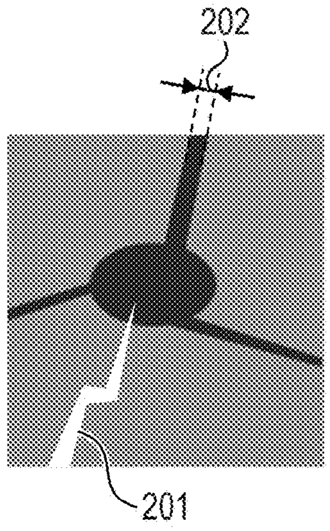
FIG. 4B is a schematic view for illustrating a case in which a crack occurs by application of an external stress.
Figure 4C:
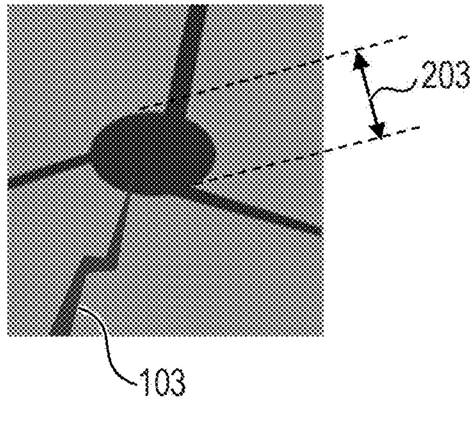
FIG. 4C is a schematic view for illustrating a situation in which a crack site is self-repaired through heat treatment.

FIG. 4A is a schematic view of FIG. 2A. It is assumed that, in such a structure as illustrated in FIG. 4A, a crack 201 occurs as illustrated in FIG. 4B by an external stress during use. In this case, when heat treatment is performed within the above-mentioned temperature range, the first region 104 having a melting point within this temperature range and having composition close to an eutectic composition of zirconia and silica (eutectic point: 1,687° C.) is softened or melted. A molten component wet-spreads from the first region 104 to the crack 201 through a capillary phenomenon, and the crack is repaired by an oxide mainly containing Si, to thereby form a new second region 103 as illustrated in FIG. 4C. Thus, the ceramic shaped object 100 of this embodiment has a function in which, even when a crack occurs, the crack is self-repaired by performing heat treatment again within the range from 1,690° C. to 1,790° C., and the ceramic shaped object after heat treatment can be restored to the same level as that of an original mechanical strength. This feature is an effect obtained by virtue of, in particular, a presence of the second region 103, in the region 102 mainly containing Si included in the ceramic shaped object 100.

In the ceramic shaped object of this embodiment, at least one of the second region 103, a new second region 103 that is a self-repaired portion of the crack, and the first region 104 included in the ceramic shaped object 100 can be observed when an inside of a two-dimensional plane of 2 mm×2 mm is observed. The second region 103 has an average width of 1 μm or more and a ratio between a length and an average width of 10 or more, and hence can be discriminated from a region that is not caused by the crack. Here, the average width refers to, for example, an average obtained by measuring a width 202 of the second region at five or more positions. In addition, the average width refers to an average obtained by also measuring a width 203 of the first region at five or more positions. When the second region 103 extends in a curved shape instead of a linear shape, the length measured along the curve is used. Regarding the first region 104, an area of the first region 104 is preferably determined, and a value thereof is 78.5 $\mu m^2$ or more. The first region 104 and the second region 103 each actually have a three-dimensional structure, but it is also preferred to calculate each of the first region 104 and the second region 103 as an average of a plurality of corresponding portions present in an observation region of 2 mm×2 mm in order to allow the cross-sectional observation to substitute for evaluation.

As described above, the ceramic shaped object 100 in this embodiment is characterized by including a function of self-repairing a crack 201 that subsequently occurs. This function allows a material mainly containing Si to seep out from the first region 104 to the crack 201 through a capillary phenomenon and hence results in a reduction in the material mainly containing Si in the first region 104 to generate pores in some cases. The generation of the pores in the first region 104 is relatively non-problematic because the crack 201 having high influence on the mechanical strength is repaired.

Further, the ceramic shaped object of this embodiment preferably contains Y, and optionally Al. In particular, the region 101 mainly containing Zr is preferably formed of $ZrO_2$, and further the region 101 preferably contains Y as $Y_2O_3$-stabilized $ZrO_2$. The content of $Y_2O_3$ contained in $ZrO_2$ is preferably 1.5 mol % or more and 10.5 mol % or less, more preferably 2.0 mol % or more and 4.5 mol % or less. In addition, Y may be present as an oxide formed of Si and Y in the region 102 mainly containing Si.

In the ceramic shaped object of this embodiment, it is preferred that when a content of Zr is converted into a mass of $ZrO_2$, a content of Si is converted into a mass of $SiO_2$, a content of Y is converted into a mass of $Y_2O_3$, and a content of Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α' (mass %), β' (mass %), and γ' (mass %), respectively, α', β', and γ' satisfy the following expressions.

$$77.6 \leq \alpha' \leq 93.5$$

$$4.4 \leq \beta' \leq 6.5$$

$$0.4 \leq \gamma' \leq 17.3$$

Accordingly, the ceramic shaped object of this embodiment can have high strength while maintaining the crack self-repairing property.

In a case of a lower limit value or more in the composition range in terms of $SiO_2$, the crack self-repairing property of the ceramic shaped object of this embodiment can be maintained. In a case of an upper limit value or less, the high mechanical strength can be satisfied. The three-point flexural strength value is preferably 50 MPa or more, more preferably 100 MPa or more, still more preferably 150 MPa or more. The three-point flexural strength value may also be set to 200 MPa or more. The three-point flexural strength value may be 1,000 MPa or less, 500 MPa or less, or 400 MPa or less.

The ceramic shaped object of this embodiment preferably contains Al, and when the mass of $Al_2O_3$ with respect to the total amount of the mass of $ZrO_2$, the mass of $Y_2O_3$, the mass of $SiO_2$, and the mass of $Al_2O_3$ is represented by δ' (mass %), δ' preferably satisfies the following expression.

$$0.2 \leq \delta' \leq 8.3$$

Accordingly, the ceramic shaped object of this embodiment can have high mechanical strength while maintaining the crack self-repairing property.

In order for the ceramic shaped object of this embodiment to maintain the crack self-repairing property and having high strength, the $Y_2O_3$ concentration of $Y_2O_3$-stabilized $ZrO_2$ in the ceramic shaped object is important, and it is required that Si and Al form a compound or the like that does not exclude Y and an amorphous substance to serve as an adjuster for the $Y_2O_3$ concentration in $ZrO_2$. Thus, a relative relationship between concentrations of Y and Al in the region 101 mainly containing Zr and concentrations of Y and Al in the region 102 mainly containing Si is important.

In particular, the following three patterns obtained by a slight difference in processes for producing a ceramic shaped object are the features of this embodiment.

(1) In a cross-section in a vicinity of a center of the ceramic shaped object, an average of output signals of Zr by SEM-EDS, an average of output signals of Y by SEM-EDS, and an average of output signals of Al by SEM-EDS may each be larger in a region mainly containing Zr than in a region mainly containing Si, and an average of output signals of Si by SEM-EDS may be larger in the region mainly containing Si than in the region mainly containing Zr. The foregoing is defined as follows: a type of a ceramic shaped object is a type (III). In this embodiment, the SEM-EDS output signals refer to an integral intensity of peaks of characteristic X-rays of target elements (Zr, Y, Al, Si), and an average of the SEM-EDS output signals refers to a value obtained by averaging the SEM-EDS output signals in a region mainly containing Zr or Si.

(2) In the cross-section in the vicinity of the center of the ceramic shaped object, an average of output signals of Zr by SEM-EDS and an average of output signals of Y by SEM-EDS may each be larger in a region mainly containing Zr than in a region mainly containing Si, and an average of output signals of Si by SEM-EDS and an average of output signals of Al by SEM-EDS may each be larger in a region mainly containing Si than in a region mainly containing Zr. The foregoing is defined as follows: a type of a ceramic shaped object is a type (II).

(3) In the cross-section in the vicinity of the center of the ceramic shaped object, an average of output signals of Zr by SEM-EDS may be larger in a region mainly containing Zr than in a region mainly containing Si, and an average of output signals of Si by SEM-EDS, an average of output signals of Y by SEM-EDS, and an average of output signals of Al by SEM-EDS may each be larger in a region mainly containing Si than in a region mainly containing Zr. The foregoing is defined as follows: a type of a ceramic shaped object is a type (I).

In a relative comparison based on the above-mentioned types, a relationship of type (I)>type (II)>type (III) is established in decreasing order of three-point flexural strength. This relationship indicates the following: in Table 1, when a three-point flexural strength in a case where a type of the ceramic shaped object is a type (I) has a largest value in Example 37, the three-point flexural strength in a case where a type of the ceramic shaped object is a type (II) has a largest value in Example 14, and the three-point flexural strength in a case where a type of the ceramic shaped object is a type (III) has the largest value in Example 11, largest values of the three-point flexural strength satisfy the relationship of type (I)>type (II)>type (III). As described above, a state in which a relative concentrations of Y and Al in a region mainly containing Si are higher than those in a region mainly containing Zr is preferred. When the material powder contains Al, a region (region 107 in FIG. 5(*h*)) mainly containing Al may be present, but types can be determined based on a region mainly containing Zr and a region mainly containing Si.

The three-point flexural strength value is preferably 50 MPa or more, more preferably 100 MPa or more, still more preferably 150 MPa or more. The three-point flexural strength value may also be set to 200 MPa or more. The three-point flexural strength value may be 1,000 MPa or less, 500 MPa or less, or 400 MPa or less.

FIG. 3A is an enlarged view of a cross-section of a shaped object. In FIG. 3A, a plurality of regions 101 and 103 are shown, and boundaries therebetween are indicated by broken lines. A typical example of Zr, Y, Si, and Al distributions in each of regions is described below. Each of the regions may not contain at least any one of Zr, Y, Si, and Al. For example, Al may not be present in the region 101.

The region 101 typified by Area #2 in FIG. 3A is a base region. The region 101 contains Zr. The region 101 may contain Y in an amount per unit volume smaller than an amount of Zr per unit volume in the region 101. The region 101 may contain Al in an amount per unit volume smaller than an amount of Zr per unit volume in the region 101. An amount of Al per unit volume in the region 101 may be smaller than an amount of Y per unit volume in the region 101.

The region 103 typified by Area #1 in FIG. 3A is a crack-repaired region. The region 103 contains Si. An amount of Si per unit volume in the region 103 may be larger than an amount of Si per unit volume in the region 101. The region 103 may contain Al. An amount of Al per unit volume in the region 103 may be larger than an amount of Al per unit volume in the region 101. The region 103 may contain Y. An amount of Al per unit volume in the region 103 may be smaller than an amount of Si per unit volume in the region 103. An amount of Y per unit volume in the region 103 may be smaller than an amount of Si per unit volume in the region 103. An amount of Y per unit volume in the region 103 may be larger or smaller than an amount of Al per unit volume in the region 103. An amount of Zr per unit volume in the region 103 may be smaller than an amount of Zr per unit volume in the region 101 and may be smaller than an amount of Si per unit volume, an amount of Al per unit volume, and an amount of Y per unit volume in the region 101.

FIG. 3B is an enlarged view of part of the region 103 in FIG. 3A. The region 103 includes a plurality of island-like regions 105 typified by Area #3 in FIG. 3B and a sea-like region 106 typified by Area #4 in FIG. 3B. The sea-like region 106 separates a plurality of island-like regions 105 from each other. In other words, a continuous sea-like region 106 is arranged between a plurality of island-like regions 105. It is preferred that the region 103 include the plurality of island-like regions 105 and the sea-like region 106 that separates the plurality of island-like regions 105 from each other, and that the island-like regions 105 each mainly contain Si. The sea-like region 106 preferably contains Al. The sea-like region 106 may also contain Si, but an amount of Si per unit volume in the sea-like region 106 may be smaller than an amount of Si per unit volume in the island-like regions 105. The amount of Si per unit volume in the sea-like region 106 may be smaller or larger than an amount of Al per unit volume in the sea-like region 106.

In addition, the island-like regions 105 may also each contain Al, but an amount of Al in the island-like regions 105 may be smaller than the amount of Al in the sea-like region 106. The amount of Al per unit volume in the island-like regions 105 may be smaller than the amount of Si per unit volume in the island-like regions 105. In addition, the sea-like region 106 may contain Y. An amount of Y per unit volume in the sea-like region 106 may be larger than an amount of Y per unit volume in the region 101. The island-like regions 105 may also each contain Y, but an amount of Y per unit volume in the island-like regions 105 may be smaller than an amount of Y per unit volume in the sea-like region 106.

Modified Example

The modified example is directed to a ceramic shaped object, and is different from the fourth embodiment in that it is required that the ceramic shaped object contain Al. The modification example is the same as the fourth embodiment in terms of other points, and hence a description of the other points is omitted.

The ceramic shaped object of the modification example is a ceramic shaped object including a plurality of kinds of elements including Zr, Si, and Al, wherein the ceramic shaped object includes a region mainly containing Zr, a region mainly containing Si, and a region mainly containing Al, wherein an average of output signals of the Zr by SEM-EDS is larger in a region mainly containing Zr than in a region mainly containing Si, and wherein an average of output signals of the Si by SEM-EDS, an average of output signals of the Y by SEM-EDS, and an average of output signals of the Al by SEM-EDS are each larger in a region mainly containing Si than in a region mainly containing Zr.

In the ceramic shaped object of the modified example, it is preferred that when a content of the Zr is converted into a mass of $ZrO_2$, a content of the Si is converted into a mass of $SiO_2$, a content of the Y is converted into a mass of $Y_2O_3$, and a content of the Al is converted into a mass of $Al_2O_3$, the mass of $ZrO_2$, the mass of $Y_2O_3$, the mass of $SiO_2$, and the mass of $Al_2O_3$ with respect to a total amount of the mass of $ZrO_2$, the mass of $Y_2O_3$, the mass of $SiO_2$, and the mass of $Al_2O_3$ are represented by α' (mass %), β' (mass %), γ' (mass %), and δ' (mass %), respectively, α', β', γ', and δ' satisfy the following expressions.

$$77.6 \leq \alpha' \leq 93.5$$

$$4.4 \leq \beta' \leq 6.5$$

$$0.4 \leq \gamma' \leq 17.3$$

$$0.2 \leq \delta' \leq 8.3$$

Accordingly, the ceramic shaped object of this embodiment can have high strength while maintaining the crack self-repairing property.

Application Example

The application example of the present disclosure is directed to a device. The device as the application example includes a ceramic shaped object and at least any one of an electrical component, an optical component, a metal component, or a resin component.

Various kinds of devices may be formed by combining a mechanical component that is a ceramic shaped object with at least any one of an electrical component, an optical component, a metal component, and a resin component. The mechanical component is, for example, a link component used as a hand or an arm, but may also be a transmission component, such as a gear, a cam, or a shaft, or a coupling component such as a screw. The mechanical component in this embodiment may also be used as a heat-resistant component or a refractory component. The device including the mechanical component may be a printing device or an office device, such as an inkjet printer, a laser printer, a scanner, a copying machine, or a multifunction peripheral. The device may be a video device, such as a camera, a display, or a projector. The device may be an optical device, such as an interchangeable lens or binoculars. The device may be a medical device, such as an X-ray imaging device, a CT device, an MRI device, or an endoscope. The device may be an industrial device, such as an exposure device, a film forming device, a generator, or a robot. The device may be various kinds of movable or transportation devices, such as an automobile, an aircraft, and a ship. In addition, the device may be a scientific device, such as a nuclear reactor (fusion reactor, fission reactor) or an accelerator, or a space device, such as a rocket or an artificial satellite.

EXAMPLES

A list of Examples of this embodiment and Comparative Examples is shown in Table 1. In Table 1, there are shown: the material system notation of a raw material powder in an infrared laser melting method; the composition of the raw material powder (converted values in the case of $ZrO_2$, $Y_2O_3$, $SiO_2$, and $Al_2O_3$, SiO is converted as $SiO_2$); a metal element notation of a modifier and a number of times of impregnation in an impregnation step; a firing temperature; and the results of a three-point flexural strength test (in conformity with JIS R1601:2008; average for n=2).

TABLE 1

| | | Powder composition [wt %] | | | | | |
|---|---|---|---|---|---|---|---|
| | Material system | $ZrO_2$ converted value | $Y_2O_3$ converted value | $SiO_2$ converted value | $Al_2O_3$ converted value | $Gd_2O_3$ converted value | $Tb_4O_7$ converted value |
| Example 1 | YSZ—$SiO_2$—SiO | 84.93 | 6.49 | 8.58 | — | — | — |
| Example 2 | YSZ—$SiO_2$—SiO | 84.93 | 6.49 | 8.58 | — | — | — |
| Example 3 | YSZ(Al)—$SiO_2$—SiO | 78.05 | 4.45 | 17.29 | 0.21 | — | — |

TABLE 1-continued

| | | | | | | | |
|---|---|---|---|---|---|---|---|
| Example 4 | YSZ(Al)—$SiO_2$—SiO | 78.05 | 4.45 | 17.29 | 0.21 | — | — |
| Example 5 | YSZ(Al)—$SiO_2$—SiO | 78.05 | 4.45 | 17.29 | 0.21 | — | — |
| Example 6 | YSZ(Al)—$SiO_2$—SiO | 78.05 | 4.45 | 17.29 | 0.21 | — | — |
| Example 7 | YSZ(Al)—$SiO_2$—SiO | 78.05 | 4.45 | 17.29 | 0.21 | — | — |
| Example 8 | YSZ(Al)—$SiO_2$—SiO | 78.05 | 4.45 | 17.29 | 0.21 | — | — |
| Example 9 | YSZ(Al)—$SiO_2$—SiO | 86.27 | 4.92 | 8.58 | 0.23 | — | — |
| Example 10 | YSZ(Al)—$SiO_2$—SiO | 86.27 | 4.92 | 8.58 | 0.23 | — | — |
| Example 11 | YSZ(Al)—$SiO_2$—SiO | 86.27 | 4.92 | 8.58 | 0.23 | — | — |
| Example 12 | YSZ(Al)—$SiO_2$—SiO | 86.27 | 4.92 | 8.58 | 0.23 | — | — |
| Example 13 | YSZ(Al)—$SiO_2$—SiO | 86.27 | 4.92 | 8.58 | 0.23 | — | — |
| Example 14 | YSZ(Al)—$SiO_2$—SiO | 86.27 | 4.92 | 8.58 | 0.23 | — | — |
| Example 15 | YSZ(Al)—$SiO_2$—SiO | 90.38 | 5.15 | 4.23 | 0.24 | — | — |
| Example 16 | YSZ(Al)—$SiO_2$—SiO | 90.38 | 5.15 | 4.23 | 0.24 | — | — |
| Example 17 | YSZ(Al)—SiO | 93.06 | 5.31 | 1.38 | 0.25 | — | — |
| Example 18 | YSZ(Al)—SiO | 93.06 | 5.31 | 1.38 | 0.25 | — | — |
| Example 19 | YSZ(Al)—$SiO_2$—SiO | 90.38 | 5.15 | 4.23 | 0.24 | — | — |
| Example 20 | YSZ(Al)—$SiO_2$—SiO | 90.38 | 5.15 | 4.23 | 0.24 | — | — |
| Example 21 | YSZ(Al)—$SiO_2$—SiO | 90.38 | 5.15 | 4.23 | 0.24 | — | — |
| Example 22 | YSZ(Al)—SiO | 93.06 | 5.31 | 1.38 | 0.25 | — | — |
| Example 23 | YSZ(Al)—SiO | 93.06 | 5.31 | 1.38 | 0.25 | — | — |
| Example 24 | YSZ(Al)—$SiO_2$—SiO | 90.38 | 5.15 | 4.23 | 0.24 | — | — |
| Example 25 | YSZ(Al)—$SiO_2$—SiO | 90.38 | 5.15 | 4.23 | 0.24 | — | — |
| Example 26 | YSZ(Al)—$SiO_2$—SiO | 90.38 | 5.15 | 4.23 | 0.24 | — | — |
| Example 27 | YSZ(Al)—$SiO_2$—SiO | 90.38 | 5.15 | 4.23 | 0.24 | — | — |
| Example 28 | YSZ(Al)—$SiO_2$—SiO | 90.38 | 5.15 | 4.23 | 0.24 | — | — |
| Example 29 | YSZ(Al)—$SiO_2$—SiO | 90.38 | 5.15 | 4.23 | 0.24 | — | — |
| Example 30 | YSZ(Al)—$SiO_2$—SiO—$Al_2O_3$ | 86.73 | 4.94 | 4.05 | 4.27 | — | — |
| Example 31 | YSZ(Al)—$SiO_2$—SiO—$Al_2O_3$ | 86.73 | 4.94 | 4.05 | 4.27 | — | — |
| Example 32 | YSZ(Al)—$SiO_2$—SiO—$Al_2O_3$ | 77.64 | 4.42 | 8.77 | 9.17 | — | — |
| Example 33 | YSZ(Al)—$SiO_2$—SiO—$Al_2O_3$ | 77.64 | 4.42 | 8.77 | 9.17 | — | — |
| Example 34 | YSZ(Al)—SiO—$Al_2O_3$ | 90.95 | 5.18 | 1.39 | 2.47 | — | — |
| Example 35 | YSZ(Al)—SiO—$Al_2O_3$ | 90.95 | 5.18 | 1.39 | 2.47 | — | — |
| Example 36 | YSZ(Al)—SiO—$Al_2O_3$ | 89.28 | 5.10 | 1.42 | 4.21 | — | — |
| Example 37 | YSZ(Al)—SiO—$Al_2O_3$ | 89.28 | 5.10 | 1.42 | 4.21 | — | — |
| Example 38 | YSZ(Al)—SiO—$Al_2O_3$ | 85.33 | 4.87 | 1.44 | 8.36 | — | — |
| Example 39 | YSZ(Al)—SiO—$Al_2O_3$ | 85.33 | 4.87 | 1.44 | 8.36 | — | — |
| Example 40 | YSZ(Al)—SiO—$Al_2O_3$ | 89.91 | 5.13 | 0.72 | 4.24 | — | — |
| Example 41 | YSZ(Al)—SiO—$Al_2O_3$ | 89.91 | 5.13 | 0.72 | 4.24 | — | — |
| Comparative Example 1 | YSZ(Al)—$SiO_2$—SiO | 86.27 | 4.92 | 8.58 | 0.23 | — | — |
| Comparative Example 2 | YSZ(Al)—SiO | 94.05 | 5.36 | 0.34 | 0.25 | — | — |
| Comparatlive Example 3 | $SiO_2$—$Al_2O_3$—SiO | — | — | 46.84 | 53.16 | — | — |
| Comparative Example 4 | $Al_2O_3$—$Gd_2O_3$—$Tb_4O_7$ | — | — | — | 49.06 | 46.73 | 4.21 |

| | Material system | Powder fluidity | Shaping property | Metal element notation of impregnating material | Firing temperature [° C.] | Three-point flexural strength [MPa] |
|---|---|---|---|---|---|---|
| Example 1 | YSZ—$SiO_2$—SiO | A | A | Al × three times | 1,730 | 157 |
| Example 2 | YSZ—$SiO_2$—SiO | A | A | Al × three times | 1,750 | 158 |
| Example 3 | YSZ(Al)—$SiO_2$—SiO | A | A | — | 1,690 | 161 |
| Example 4 | YSZ(Al)—$SiO_2$—SiO | A | A | — | 1,710 | 198 |
| Example 5 | YSZ(Al)—$SiO_2$—SiO | A | A | — | 1,730 | 197 |
| Example 6 | YSZ(Al)—$SiO_2$—SiO | A | A | — | 1,750 | 200 |
| Example 7 | YSZ(Al)—$SiO_2$—SiO | A | A | — | 1,770 | 228 |
| Example 8 | YSZ(Al)—$SiO_2$—SiO | A | A | — | 1,790 | 217 |
| Example 9 | YSZ(Al)—$SiO_2$—SiO | A | A | — | 1,690 | 179 |
| Example 10 | YSZ(Al)—$SiO_2$—SiO | A | A | — | 1,710 | 214 |
| Example 11 | YSZ(Al)—$SiO_2$—SiO | A | A | — | 1,730 | 239 |
| Example 12 | YSZ(Al)—$SiO_2$—SiO | A | A | — | 1,750 | 259 |
| Example 13 | YSZ(Al)—$SiO_2$—SiO | A | A | — | 1,770 | 274 |
| Example 14 | YSZ(Al)—$SiO_2$—SiO | A | A | — | 1,790 | 286 |
| Example 15 | YSZ(Al)—$SiO_2$—SiO | A | A | — | 1,770 | 172 |
| Example 16 | YSZ(Al)—$SiO_2$—SiO | A | A | — | 1,790 | 260 |
| Example 17 | YSZ(Al)—SiO | A | A | — | 1,770 | 83 |
| Example 18 | YSZ(Al)—SiO | A | A | — | 1,790 | 87 |
| Example 19 | YSZ(Al)—$SiO_2$—SiO | A | A | Al × three times | 1,750 | 212 |
| Example 20 | YSZ(Al)—$SiO_2$—SiO | A | A | Al × three times | 1,770 | 351 |
| Example 21 | YSZ(Al)—$SiO_2$—SiO | A | A | Al × 0.5 times | 1,790 | 280 |
| Example 22 | YSZ(Al)—SiO | A | A | Al × three times | 1,770 | 141 |

TABLE 1-continued

| | | | | | | |
|---|---|---|---|---|---|---|
| Example 23 | YSZ(Al)—SiO | A | A | Al × three times | 1,790 | 173 |
| Example 24 | YSZ(Al)—$SiO_2$—SiO | A | A | LiSi × twice | 1,790 | 234 |
| Example 25 | YSZ(Al)—$SiO_2$—SiO | A | A | Na × twice | 1,790 | 230 |
| Example 26 | YSZ(Al)—$SiO_2$—SiO | A | A | K × twice | 1,790 | 221 |
| Example 27 | YSZ(Al)—$SiO_2$—SiO | A | A | Ca × twice | 1,790 | 278 |
| Example 28 | YSZ(Al)—$SiO_2$—SiO | A | A | Y × three times | 1,790 | 239 |
| Example 29 | YSZ(Al)—$SiO_2$—SiO | A | A | Y × twice/ Al × once | 1,790 | 277 |
| Example 30 | YSZ(Al)—$SiO_2$—SiO—$Al_2O_3$ | A | A | — | 1,750 | 77 |
| Example 31 | YSZ(Al)—$SiO_2$—SiO—$Al_2O_3$ | A | A | — | 1,790 | 103 |
| Example 32 | YSZ(Al)—$SiO_2$—SiO—$Al_2O_3$ | A | A | — | 1,710 | 168 |
| Example 33 | YSZ(Al)—$SiO_2$—SiO—$Al_2O_3$ | A | A | — | 1,750 | 164 |
| Example 34 | YSZ(Al)—SiO—$Al_2O_3$ | A | A | — | 1,690 | 183 |
| Example 35 | YSZ(Al)—SiO—$Al_2O_3$ | A | A | — | 1,790 | 316 |
| Example 36 | YSZ(Al)—SiO—$Al_2O_3$ | A | A | — | 1,690 | 196 |
| Example 37 | YSZ(Al)—SiO—$Al_2O_3$ | A | A | — | 1,790 | 361 |
| Example 38 | YSZ(Al)—SiO—$Al_2O_3$ | A | A | — | 1,690 | 278 |
| Example 39 | YSZ(Al)—SiO—$Al_2O_3$ | A | A | — | 1,790 | 203 |
| Example 40 | YSZ(Al)—SiO—$Al_2O_3$ | A | A | — | 1,690 | 151 |
| Example 41 | YSZ(Al)—SiO—$Al_2O_3$ | A | A | — | 1,790 | 325 |
| Comparative Example 1 | YSZ(Al)—$SiO_2$—SiO | B | — | — | — | — |
| Comparative Example 2 | YSZ(Al)—SiO | A | B | — | — | — |
| Comparatlive Example 3 | $SiO_2$—$Al_2O_3$—SiO | A | A | — | 1,690 | 108 |
| Comparative Example 4 | $Al_2O_3$—$Gd_2O_3$—$Tb_4O_7$ | A | A | Zr × three times | 1,690 | 140 |

In Table 2, there are shown: the material system notation of a raw material powder in an infrared laser melting method; the relative comparison between a region mainly containing Zr and a region mainly containing Si in a mapping image of SEM-EDS in which a region having a larger EDS signal is indicated by “A”, and a region having a smaller EDS signal is indicated by “B”; a type of a ceramic shaped object as results of the relative comparison; and finally, the presence or absence of a crack self-repairing property in which a case of the presence of the crack self-repairing property is indicated by “A”, and the case of the absence of the crack self-repairing property is indicated by “B”. The details are described later.

TABLE 2

| | Material system | Region | SEM-EDS measurement signal-relative intensity comparison Zr | Si | Y | Al | Type of ceramic shaped object | Crack-repairing property |
|---|---|---|---|---|---|---|---|---|
| Example 1 | 4YSZ—$SiO_2$—SiO | Zr | A | B | A | B | II | A |
| | | Si | B | A | B | A | | |
| Example 2 | 4YSZ—$SiO_2$—SiO | Zr | A | B | A | B | II | A |
| | | Si | B | A | B | A | | |
| Example 3 | 3YSZ(Al)—$SiO_2$—SiO | Zr | A | B | A | A | III | A |
| | | Si | B | A | B | B | | |
| Example 4 | 3YSZ(Al)—$SiO_2$—SiO | Zr | A | B | A | A | III | A |
| | | Si | B | A | B | B | | |
| Example 5 | 3YSZ(Al)—$SiO_2$—SiO | Zr | A | B | A | A | III | A |
| | | Si | B | A | B | B | | |
| Example 6 | 3YSZ(Al)—$SiO_2$—SiO | Zr | A | B | A | A | III | A |
| | | Si | B | A | B | B | | |
| Example 7 | 3YSZ(Al)—$SiO_2$—SiO | Zr | A | B | A | A | III | A |
| | | Si | B | A | B | B | | |
| Example 8 | 3YSZ(Al)—$SiO_2$—SiO | Zr | A | B | A | A | III | A |
| | | Si | B | A | B | B | | |
| Example 9 | 3YSZ(Al)—$SiO_2$—SiO | Zr | A | B | A | A | II or III | A |
| | | Si | B | A | B | B | | |
| Example 10 | 3YSZ(Al)—$SiO_2$—SiO | Zr | A | B | A | A | II or III | A |
| | | Si | B | A | B | B | | |
| Example 11 | 3YSZ(Al)—$SiO_2$—SiO | Zr | A | B | A | A | II or III | A |
| | | Si | B | A | B | B | | |

TABLE 2-continued

| | Material system | Region | SEM-EDS measurement signal-relative intensity comparison Zr | Si | Y | Al | Type of ceramic shaped object | Crack-repairing property |
|---|---|---|---|---|---|---|---|---|
| Example 12 | 3YSZ(Al)—$SiO_2$—SiO | Zr | A | B | A | B | II | A |
| | | Si | B | A | B | A | | |
| Example 13 | 3YSZ(Al)—$SiO_2$—SiO | Zr | A | B | A | B | II | A |
| | | Si | B | A | B | A | | |
| Example 14 | 3YSZ(Al)—$SiO_2$—SiO | Zr | A | B | A | B | II | A |
| | | Si | B | A | B | A | | |
| Example 15 | 3YSZ(Al)—$SiO_2$—SiO | Zr | A | B | A | B | II | A |
| | | Si | B | A | B | A | | |
| Example 16 | 3YSZ(Al)—$SiO_2$—SiO | Zr | A | B | A | B | II | A |
| | | Si | B | A | B | A | | |
| Example 17 | 3YSZ(Al)—$SiO_2$—SiO | Zr | A | B | B | B | I | A |
| | | Si | B | A | A | A | | |
| Example 18 | $_3$YSZ(Al)—$SiO_2$—SiO | Zr | A | B | B | B | I | A |
| | | Si | B | A | A | A | | |
| Example 19 | 3YSZ(Al)—$SiO_2$—SiO | Zr | A | B | B | B | I | A |
| | | Si | B | A | A | A | | |
| Example 20 | 3YSZ(Al)—SiO | Zr | A | B | B | B | I | A |
| | | Si | B | A | A | A | | |
| Example 30 | YSZ(Al)—$SiO_2$—SiO—$Al_2O_3$ | Zr | A | B | B | B | I | A |
| | | Si | B | A | A | A | | |
| Example 31 | YSZ(Al)—$SiO_2$—SiO—$Al_2O_3$ | Zr | A | B | B | B | I | A |
| | | Si | B | A | A | A | | |
| Example 32 | YSZ(Al)—$SiO_2$—SiO—$Al_2O_3$ | Zr | A | B | B | B | I | A |
| | | Si | B | A | A | A | | |
| Example 33 | YSZ(Al)—$SiO_2$—SiO—$Al_2O_3$ | Zr | A | B | B | B | I | A |
| | | Si | B | A | A | A | | |
| Example 34 | YSZ(Al)—SiO—$Al_2O_3$ | Zr | A | B | B | B | I | A |
| | | Si | B | A | A | A | | |
| Example 35 | YSZ(Al)—SiO—$Al_2O_3$ | Zr | A | B | B | B | I | A |
| | | Si | B | A | A | A | | |
| Example 36 | YSZ(Al)—SiO—$Al_2O_3$ | Zr | A | B | B | B | I | A |
| | | Si | B | A | A | A | | |
| Example 37 | YSZ(Al)—SiO—$Al_2O_3$ | Zr | A | B | B | B | I | A |
| | | Si | B | A | A | A | | |
| Example 38 | YSZ(Al)—SiO—$Al_2O_3$ | Zr | A | B | B | B | I | A |
| | | Si | B | A | A | A | | |
| Example 39 | YSZ(Al)—SiO—$Al_2O_3$ | Zr | A | B | B | B | I | A |
| | | Si | B | A | A | A | | |
| Example 40 | YSZ(Al)—SiO—$Al_2O_3$ | Zr | A | B | B | B | I | A |
| | | Si | B | A | A | A | | |
| Example 41 | YSZ(Al)—SiO—$Al_2O_3$ | Zr | A | B | B | B | I | A |
| | | Si | B | A | A | A | | |
| Comparative Example 1 | 3YSZ(Al)—$SiO_2$ | Zr | — | — | — | — | — | B |
| | | Si | — | — | — | — | | |

The common items in a production of ceramic shaped objects according to Examples are described below.

The configuration of the inorganic material powder used in the infrared laser melting method was based on the following three kinds of particles: zirconia particles; silica particles; and silicon monoxide particles. The following two kinds of particles were used as the zirconia particles: yttrium-stabilized zirconia 4YSZ (TZ-4YS, manufactured by Tosoh Corporation) having a median of particle sizes of 40 μm; and yttrium-stabilized zirconia 3YSZ(AI) (TZ-B30, manufactured by Tosoh Corporation) having a median of particle sizes of 30 μm. $SiO_2$ (amorphous silica HS304, manufactured by NIPPON STEEL Chemical & Material Co., Ltd.) having a median of particle sizes of 28 μm was used as the silica particles. SiO (manufactured by Japan Natural Energy & Resources Co., Ltd.) having a median of particle sizes of 5 μm was used as the silicon monoxide particles. $Al_2O_3$ (CB-A20S, manufactured by Showa Denko K.K.) having a median of particle sizes of 24 μm was used as alumina particles.

In each of Examples and Comparative Examples, the above-mentioned particles were blended and used so as to achieve the composition of the powder for ceramic shaping shown in Table 1.

An intermediate shaped object was produced as a precursor for forming a ceramic shaped object through use of ProX DMP 100 manufactured by 3D Systems, Inc. in the infrared laser melting method under the common conditions of a lamination thickness of 20 μm, a laser power of 30 W, and a scanning speed of 160 mm/sec. The intermediate shaped object produced had a shape of 5 mm (width)×5 mm (thickness)×38 mm (total length).

After that, in Examples 1, 2, and 19 to 29, the intermediate shaped objects were immersed in various metal component-containing liquids, and the liquids were allowed to penetrate to an inside of the intermediate shaped objects under reduced pressure. The metal component-containing liquids were as follows: an Al-containing impregnating liquid (Alumina Sol 520-A, manufactured by Nissan Chemical Corporation) was used in each of Examples 1, 2, and 19 to 23; a LiSi-containing impregnating liquid (Lithium Silicate 35, Nippon Chemical Industrial Co., Ltd.) was used in Example 24; a Na-containing impregnating liquid (Sodium Polyacrylate 45% in water, manufactured by Gelest, Inc.) was used in Example 25; a K-containing impregnating liquid (Potassium Methoxyethoxide Solution, manufactured by Sigma-Aldrich Japan G.K.) was used in Example 26; a Ca-containing impregnating liquid (Calcium Methoxyethoxide, 20% in methoxyethanol, manufactured by Gelest, Inc.) was used in Example 27; a Y-containing impregnating liquid (Yttrium Methoxyethoxide, 15-18% in methoxyethanol, manufactured by Gelest, Inc.) was used in Example 28; and two kinds of the above-mentioned Y-containing impregnating liquid and the above-mentioned Al-containing impregnating liquid were used in Example 29.

Further, the step of decompressing the intermediate shaped object in a state of being immersed in the metal component-containing liquid, to thereby allow the metal component-containing liquid to permeate to the inside of a fine crack, followed by drying at 600° C., was performed. A number of repetitions of the step is shown in Table 1. The term "0.5 times" refers to the case in which the impregnating liquid diluted 2-fold was used. Heat treatment was performed by setting the maximum temperature to a range from 1,690° C. to 1,790° C. and holding the intermediate shaped object at a temperature in this range for 20 minutes.

<Evaluation>

[Three-Point Flexural Strength Test]

A structural body produced through use of a direct manufacturing system (powder bed fusion or infrared laser melting method) was measured for the flexural strength of high-strength ceramics by a test method of a three-point flexural strength test for fine ceramics (JIS R1601:2008). The three-point flexural strength test was performed in conformity with JIS R1601:2008; average for n=2. The flexural strength test is performed under conditions of a test piece size of 3 mm×4 mm×38 mm, a test piece width W of 4 mm, a test piece thickness T of 3 mm, a distance L between fulcrums of 30 mm, and an indentation speed of 0.5 mm/min. When a maximum load (N) when a test piece is ruptured is represented by P, a flexural strength [MPa] is determined from $(3\times P\times L)/(2\times W\times T^2)$. Then, an average of the flexural strengths obtained from two of the test pieces produced under same conditions was calculated. The results are as shown in Table 1.

[Cross-Sectional SEM Observation and SEM-EDS Measurement Signals]

A cross-section of 3 mm×4 mm in a vicinity of a center of the test piece ruptured in the three-point flexural strength test was cut out into a thickness of about 2 mm with a diamond wire saw or a low-speed precision cutting machine. A test piece was fixed to a polishing jig, and a cross-section of 3 mm×4 mm of the test piece was subjected to precision polishing. The polishing was performed by gradually changing a grain size of an abrasive from a coarse size to a fine size, and then the polishing was allowed to proceed with a diamond paste of 6 μmφ, 3 μmφ, and 1 μmφ in the stated order. Finally, the resultant was subjected to buffing with colloidal silica, followed by ultrasonic cleaning, so that no abrasive remained on the polished surface. SEM observation (cross-sectional SEM observation) was performed on a polished surface, and SEM-EDS mapping was obtained for Si, Al, Zr, and Y in the field of view in which the SEM observation was performed. In the SEM-EDS measurement signals in Table 2, from the SEM-EDS results, a region in which Si, Al, Zr, or Y was present in a relatively large amount, out of a region mainly containing Zr and a region mainly containing Si, was indicated by "A", and a region in which Si, Al, Zr, or Y was present in a relatively small amount, out of the regions, was indicated by "B".

[Type of Ceramic Shaped Object]

The type of the ceramic shaped object was determined from results of a cross-sectional SEM observation and SEM-EDS measurement signals. The results are as shown in Table 2. The details of a type (I), a type (II), and a type (III) are as described above. An example in which "II or III" is shown in Table 2 is an example in which the type (II) and the type (III) are mixed in the type of the ceramic shaped object.

Figure 5:
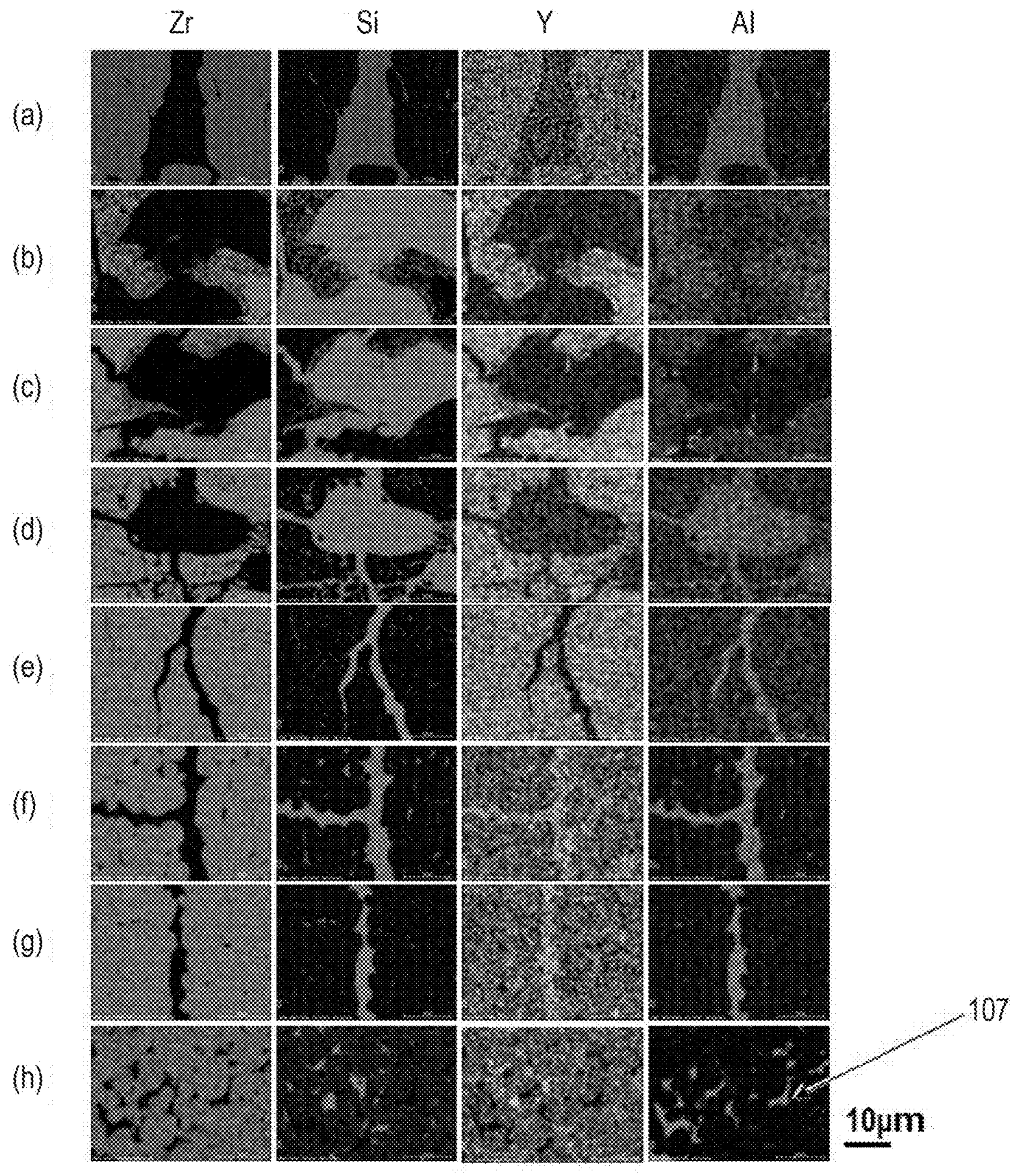
FIG. 5(*a*), FIG. 5(*b*), FIG. 5(*c*), FIG. 5(*d*), FIG. 5(*e*), FIG. 5(*f*), FIG. 5(*g*), and FIG. 5(*h*) are elemental mapping images of Zr, Si, Y, and Al according to SEM-EDS evaluations for a plurality of Examples of the ceramic shaped object of this embodiment.

Typical SEM-EDS element mapping images are shown in FIG. 5(*a*) to FIG. 5(*h*).

[Crack-Repairing Property]

In the ceramic shaped object of this embodiment, a crack newly occurs by impact, for example, when the three-point flexural strength test is performed. A test piece ruptured in the three-point flexural strength test was subjected to a cross-sectional SEM observation and SEM-EDS analysis before and after the step similar to the heating step included in the method of producing a ceramic shaped object was performed again. Thus, whether or not the crack was repaired and a second region was further formed was recognized. In Table 2, the crack-repairing property in Table 2 was indicated by "A" for an example in which it was recognized that the crack was repaired in the heating step performed again, and the crack-repairing property in Table 2 was indicated by "B" for an example in which it was not recognized that the crack was repaired in the heating step performed again.

[Composition Analysis of Ceramic Shaped Object]

The composition of the ceramic shaped object is determined by subjecting a test piece to Inductively Coupled Plasma atomic emission spectroscopy (ICP atomic emission spectroscopy). A test piece is wrapped with a plastic bag, crushed with a hammer, and diluted by acid decomposition treatment. Acid decomposition is performed by mixing 3 ml of a $HBF_4$ liquid, 3 ml of a $H_2SO_4$ liquid, 3 ml of water, and 20 mg to 30 mg of a sample, and holding the mixture at a maximum temperature of 230° C. for 30 minutes. This solution is subjected to the ICP-AES measurement, and element ratios are determined. The crushed test piece is partially collected and subjected to acid decomposition in each of two solutions to be turned into a solution. Each of the solutions is subjected to the ICP-AES measurement twice, and an average of the four ICP-AES measurement results in total is calculated. The results are as shown in Table 3.

TABLE 3

| | Material system | Composition of ceramic shaped object [mass %] | | | |
|---|---|---|---|---|---|
| | | $ZrO_2$ Converted value | $Y_2O_3$ Converted value | $SiO_2$ Converted value | $Al_2O_3$ Converted value |
| Example 1 | 4YSZ—$SiO_2$—SiO | 84.1 | 6.4 | 8.5 | 1.0 |
| Example 2 | 4YSZ—$SiO_2$—SiO | 84.1 | 6.4 | 8.5 | 1.0 |
| Example 3 | 3YSZ(Al)—$SiO_2$—SiO | 78.1 | 4.4 | 17.3 | 0.2 |
| Example 4 | 3YSZ(Al)—$SiO_2$—SiO | 78.1 | 4.4 | 17.3 | 0.2 |
| Example 5 | 3YSZ(Al)—$SiO_2$—SiO | 78.1 | 4.4 | 17.3 | 0.2 |
| Example 6 | 3YSZ(Al)—$SiO_2$—SiO | 78.1 | 4.4 | 17.3 | 0.2 |
| Example 7 | 3YSZ(Al)—$SiO_2$—SiO | 78.1 | 4.4 | 17.3 | 0.2 |
| Example 8 | 3YSZ(Al)—$SiO_2$—SiO | 78.1 | 4.4 | 17.3 | 0.2 |
| Example 9 | 3YSZ(Al)—$SiO_2$—SiO | 86.3 | 4.9 | 8.6 | 0.2 |
| Example 10 | 3YSZ(Al)—$SiO_2$—SiO | 86.3 | 4.9 | 8.6 | 0.2 |
| Example 11 | 3YSZ(Al)—$SiO_2$—SiO | 86.3 | 4.9 | 8.6 | 0.2 |
| Example 12 | 3YSZ(Al)—$SiO_2$—SiO | 86.3 | 4.9 | 8.6 | 0.2 |
| Example 13 | 3YSZ(Al)—$SiO_2$—SiO | 86.3 | 4.9 | 8.6 | 0.2 |
| Example 14 | 3YSZ(Al)—$SiO_2$—SiO | 86.3 | 4.9 | 8.6 | 0.2 |
| Example 15 | 3YSZ(Al)—$SiO_2$—SiO | 93.5 | 5.1 | 1.2 | 0.2 |
| Example 16 | 3YSZ(Al)—$SiO_2$—SiO | 93.5 | 5.1 | 1.2 | 0.2 |
| Example 17 | 3YSZ(Al)—$SiO_2$—SiO | 92.7 | 5.0 | 1.8 | 0.5 |
| Example 18 | 3YSZ(Al)—$SiO_2$—SiO | 92.7 | 5.0 | 1.8 | 0.5 |
| Example 19 | 3YSZ(Al)—$SiO_2$—SiO | 92.9 | 5.0 | 1.8 | 0.3 |
| Example 20 | 3YSZ(Al)—$SiO_2$ | 92.2 | 5.2 | 1.4 | 1.2 |
| Example 30 | YSZ(Al)—$SiO_2$—SiO—$Al_2O_3$ | 87.9 | 4.9 | 3.6 | 3.6 |
| Example 31 | YSZ(Al)—$SiO_2$—SiO—$Al_2O_3$ | 87.9 | 4.9 | 3.6 | 3.6 |
| Example 32 | YSZ(Al)—$SiO_2$—SiO—$Al_2O_3$ | 78.6 | 4.5 | 8.6 | 8.3 |
| Example 33 | YSZ(Al)—$SiO_2$—SiO—$Al_2O_3$ | 78.6 | 4.5 | 8.6 | 8.3 |
| Example 34 | YSZ(Al)—SiO—$Al_2O_3$ | 92.5 | 4.9 | 0.6 | 2.0 |
| Example 35 | YSZ(Al)—SiO—$Al_2O_3$ | 92.5 | 4.9 | 0.6 | 2.0 |
| Example 36 | YSZ(Al)—SiO—$Al_2O_3$ | 90.9 | 4.9 | 0.6 | 3.6 |
| Example 37 | YSZ(Al)—SiO—$Al_2O_3$ | 90.9 | 4.9 | 0.6 | 3.6 |
| Example 38 | YSZ(Al)—SiO—$Al_2O_3$ | 87.2 | 4.7 | 0.6 | 7.5 |
| Example 39 | YSZ(Al)—SiO—$Al_2O_3$ | 87.2 | 4.7 | 0.6 | 7.5 |
| Example 40 | YSZ(Al)—SiO—$Al_2O_3$ | 90.9 | 5.0 | 0.4 | 3.7 |
| Example 41 | YSZ(Al)—SiO—$Al_2O_3$ | 90.9 | 5.0 | 0.4 | 3.7 |
| Comparative Example 1 | 3YSZ(Al)—$SiO_2$ | 93.1 | 5.3 | 1.4 | 0.3 |

Example 1

In Example 1, $SiO_2$ particles and SiO particles were weighed at ratios of 0.77 g and 0.124 g, respectively, with respect to 10 g of 4YSZ particles, and those materials were uniformly mixed to provide an inorganic material powder having a composition ratio shown in Table 1 as a powder for shaping formed of elements of Zr, Y, and Si. The powder was shaped into an intermediate shaped object for forming a ceramic shaped object. The step of impregnating the crack of the intermediate shaped object with Al serving as a modifier was performed three times, and heat treatment was performed at a heat treatment temperature (firing temperature in Table 1) of 1,730° C. The resultant was processed into a size of 4 mm (width)×3 mm (thickness)×38 mm (total length) to provide a test piece for a three-point flexural strength test. Two of the test pieces were subjected to the three-point flexural strength test. The average of three-point flexural strengths was 157 MPa.

Example 2

A test piece for a three-point flexural strength test was produced in the same manner as in Example 1 except that the heat treatment temperature was changed to 1,750° C., and the test piece was subjected to the three-point flexural strength test. The average of three-point flexural strengths was 158 MPa. The cross-section of the test piece was subjected to the SEM-EDS analysis. As a result, it was recognized that an average of detection signals of Zr by SEM-EDS and an average of detection signals of Y by SEM-EDS were larger in a region mainly containing Zr than in a region mainly containing Si, and an average of detection signals of Si by SEM-EDS and an average of detection signals of Al by SEM-EDS were larger in a region mainly containing Si than in a region mainly containing Zr. The type of the ceramic shaped object was the type (II). The EDS element mapping images of Zr, Si, Y, and Al are shown in FIG. 5(*a*).

Examples 3 to 8

In Examples 3 to 8, $SiO_2$ particles and SiO particles were weighed at ratios of 1.88 g and 0.154 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment from 1,690° C. to 1,790° C. in increments of 20° C., and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 161 MPa in Example 3, 198 MPa in Example 4, 197 MPa in Example 5, 200 MPa in Example 6, 228 MPa in Example 7, and 217 MPa in Example 8. The cross-section of each of the samples was subjected to the SEM-EDS analysis. As a result, it was recognized that, in any of samples, an average of detection signals of Zr by SEM-EDS, an average of detection signals of Y by SEM-EDS, and an average of detection signals of Al by SEM-EDS were larger in a region mainly containing Zr than in a region mainly containing Si, and an average of detection signals of Si by SEM-EDS was larger in a region mainly containing Si than in a region mainly containing Zr. The type of each of the ceramic shaped objects was the type (III). EDS element mapping images of Zr, Si, Y, and Al of Example 8 are shown in FIG. 5(*b*).

Examples 9 to 11

In Examples 9 to 11, $SiO_2$ particles and SiO particles were weighed at ratios of 0.77 g and 0.124 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment from 1,690° C. to 1,730° C. in increments of 20° C., and were each processed into a size of 4 mm (width)×3 mm (thickness)×38 mm (total length) that was a flexural strength test shape to provide a test piece for a three-point flexural strength test. Two each of the test pieces thus produced were subjected to the three-point flexural strength test. Averages of three-point flexural strengths were 179 MPa in Example 9, 214 MPa in Example 10, and 239 MPa in Example 11. The cross-section of each of the samples was subjected to the SEM-EDS analysis. As a result, it was recognized that, in any of the samples, a region in which the type of the ceramic shaped object was the type (III), and a region in which the type of the ceramic shaped object was the type (II) were mixed. A region in which the type of the ceramic shaped object was the type (III) was characterized in that an average of detection signals of Zr by SEM-EDS, an average of detection signals of Y by SEM-EDS, and an average of detection signals of Al by SEM-EDS were larger in a region mainly containing Zr than in a region mainly containing Si, and an average of detection signals of Si by SEM-EDS was larger in a region mainly containing Si than in a region mainly containing Zr. A region in which the type of the ceramic shaped object was the type (II) was characterized in that an average of detection signals of Zr by SEM-EDS and an average of detection signals of Y by SEM-EDS were larger in a region mainly containing Zr than in a region mainly containing Si, and an average of detection signals of Si by SEM-EDS and an average of detection signals of Al by SEM-EDS were larger in a region mainly containing Si than in a region mainly containing Zr. EDS element mapping images of Zr, Si, Y, and Al of Example 11 are shown in FIG. 5(*c*). The EDS element mapping images shown in FIG. 5(*c*) correspond to a case in which the type of the ceramic shaped object is the type (III), and show the distributions of Zr, Si, Y, and Al, respectively.

Examples 12 to 14

In Examples 12 to 14, $SiO_2$ particles and SiO particles were weighed at ratios of 0.77 g and 0.124 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment from 1,750° C. to 1,790° C. in increments of 20° C., and were each processed into a size of 4 mm (width)×3 mm (thickness)×38 mm (total length) that was a flexural strength test shape to provide a test piece for a three-point flexural strength test. Two each of the test pieces thus produced were subjected to the three-point flexural strength test. Averages of three-point flexural strengths were 259 MPa in Example 12, 274 MPa in Example 13, and 286 MPa in Example 14. A cross-section of each of the samples was subjected to the SEM-EDS analysis. As a result, it was recognized that, in any of the samples, there was a region in which the type of the ceramic shaped object was the type (II), a region being characterized in that an average of detection signals of Zr by SEM-EDS and an average of detection signals of Y by SEM-EDS were larger in a region mainly containing Zr than in a region mainly containing Si, and an average of detection signals of Si by SEM-EDS and an average of detection signals of Al by SEM-EDS were larger in a region mainly containing Si than in a region mainly containing Zr. EDS element mapping images of Zr, Si, Y, and Al of Example 14 are shown in FIG. 5(*d*).

Examples 15 and 16

In Examples 15 and 16, $SiO_2$ particles and SiO particles were weighed at ratios of 0.29 g and 0.111 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,770° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 172 MPa in Example 15 and 260 MPa in Example 16. A cross-section of each of the samples was subjected to the SEM-EDS analysis. As a result, it was recognized that, in any of the samples, there was a region in which the type of the ceramic shaped object was the type (II), a region being characterized in that an average of detection signals of Zr by SEM-EDS and an average of detection signals of Y by SEM-EDS were larger in a region mainly containing Zr than in a region mainly containing Si, and an average of detection signals of Si by SEM-EDS and an average of detection signals of Al by SEM-EDS were larger in a region mainly containing Si than in a region mainly containing Zr. EDS element mapping images of Zr, Si, Y, and Al of Example 16 are shown in FIG. 5(*e*).

Examples 17 and 18

In Examples 17 and 18, $SiO_2$ particles and SiO particles were weighed at ratios of 0.29 g and 0.111 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. In Examples 17 and 18, the intermediate shaped objects were subjected to heat treatment at heating temperatures of 1,770° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 83 MPa in Example 17 and 87 MPa in Example 18. A cross-section of each of the samples was subjected to the SEM-EDS analysis. As a result, it was recognized that, in any of the samples, there was a region in which the type of the ceramic shaped object was the type (I), a region being characterized in that an average of detection signals of Zr by SEM-EDS was larger in a region mainly containing Zr than in a region mainly containing Si, and an average of detection signals of Si by SEM-EDS, an average of detection signals of Y by SEM-EDS, and an average of detection signals of Al by SEM-EDS were larger in a region mainly containing Si than in a region mainly containing Zr. EDS element mapping images of Zr, Si, Y, and Al of Example 18 are shown in FIG. 5(*f*).

Example 19

In Example 19, SiO particles were weighed at a ratio of 0.103 g with respect to 10 g of 3YSZ(Al) particles, and those materials were uniformly mixed to provide an inorganic material powder having a composition ratio shown in Table 1 as a powder for shaping formed of elements of Zr, Y, Si, and Al. The powder was shaped into an intermediate shaped object for forming a ceramic shaped object. The step of impregnating a crack of the intermediate shaped object with Al serving as a modifier was performed three times, and heat treatment was performed at a treatment temperature of 1,750° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 212 MPa.

Example 20

In Example 20, SiO particles were weighed at a ratio of 0.103 g with respect to 10 g of 3YSZ(Al) particles, and those materials were uniformly mixed to provide an inorganic material powder having a composition ratio shown in Table 1 as a powder for shaping formed of elements of Zr, Y, Si, and Al. The powder was shaped into an intermediate shaped object for forming a ceramic shaped object. The step of impregnating the crack of the intermediate shaped object with Al serving as a modifier was performed three times, and heat treatment was performed at a treatment temperature of 1,770° C. The resultant was processed into a size of 4 mm (width)×3 mm (thickness)×38 mm (total length) to provide a test piece for a three-point flexural strength test. Two of the test pieces thus produced were subjected to the three-point flexural strength test. The average of three-point flexural strengths was 351 MPa. The cross-section of each of the samples was subjected to the SEM-EDS analysis. As a result, it was recognized that, in any of the samples, there was a region in which the type of the ceramic shaped object was the type (I), a region being characterized in that an average of detection signals of Zr by SEM-EDS was larger in a region mainly containing Zr than in a region mainly containing Si, and an average of detection signals of Si by SEM-EDS, an average of detection signals of Y by SEM-EDS, and an average of detection signals of Al by SEM-EDS were larger in a region mainly containing Si than in a region mainly containing Zr. The EDS element mapping images of Zr, Si, Y, and Al of Example 20 are shown in FIG. 5(*g*).

Example 21

The same intermediate shaped object as that of Example 16 was produced in Example 21. The step of impregnating the crack of the intermediate shaped object with Al serving as a modifier was performed 0.5 times, and heat treatment was performed at a treatment temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. The average of three-point flexural strengths was 280 MPa.

Example 22

The same intermediate shaped object as that of Example 17 was produced in Example 22. The step of impregnating the crack of the intermediate shaped object with Al serving as a modifier was performed three times, and heat treatment was performed at a treatment temperature of 1,770° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 141 MPa.

Example 23

A same intermediate shaped object as that of Example 17 was produced in Example 23. The step of impregnating the crack of the intermediate shaped object with Al serving as a modifier was performed three times, and heat treatment was performed at a treatment temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 173 MPa.

Example 24

A same intermediate shaped object as that of Example 16 was produced in Example 24. The step of impregnating the crack of the intermediate shaped object with LiSi serving as a modifier was performed twice, and heat treatment was performed at a heating temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 234 MPa.

Example 25

A same intermediate shaped object as that of Example 16 was produced in Example 25. The step of impregnating the crack of the intermediate shaped object with Na serving as a modifier was performed twice, and heat treatment was performed at a treatment temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 230 MPa.

Example 26

A same intermediate shaped object as that of Example 16 was produced in Example 26. The step of impregnating the crack of the intermediate shaped object with K serving as a modifier was performed twice, and heat treatment was performed at a treatment temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 221 MPa.

Example 27

A same intermediate shaped object as that of Example 16 was produced in Example 27. The step of impregnating the crack of the intermediate shaped object with Ca serving as a modifier was performed twice, and heat treatment was performed at a heating temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 278 MPa.

Example 28

A same intermediate shaped object as that of Example 16 was produced in Example 28. The step of impregnating the crack of the intermediate shaped object with Y serving as a modifier was performed three times, and heat treatment was performed at a heating temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 239 MPa.

Example 29

A same intermediate shaped object as that of Example 16 was produced in Example 29. The steps of impregnating the crack of the intermediate shaped object with Y and Al serving as modifiers were performed twice and once, respectively, and heat treatment was performed at a heating temperature of 1,790° C. The resultant was processed into a size of 4 mm (width)×3 mm (thickness)×38 mm (total length) to provide a test piece for a three-point flexural strength test. Two of the test pieces thus produced were subjected to the three-point flexural strength test. An average of three-point flexural strengths was 277 MPa.

Examples 30 and 31

In Examples 30 and 31, $SiO_2$ particles, SiO particles, and $Al_2O_3$ particles were weighed at ratios of 0.29 g, 0.111 g, and 0.44 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,750° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 77 MPa in Example 30 and 103 MPa in Example 31.

Examples 32 and 33

In Examples 32 and 33, $SiO_2$ particles, SiO particles, and $Al_2O_3$ particles were weighed at ratios of 0.87 g, 0.144 g, and 1.09 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,710° C. and 1,750° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 168 MPa in Example 32 and 164 MPa in Example 33.

Examples 34 and 35

In Examples 34 and 35, SiO particles and $Al_2O_3$ particles were weighed at ratios of 0.106 g and 0.23 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,690° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 183 MPa in Example 34 and 316 MPa in Example 35.

Examples 36 and 37

In Examples 36 and 37, SiO particles and $Al_2O_3$ particles were weighed at ratios of 0.11 g and 0.42 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,690° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 196 MPa in Example 36 and 361 MPa in Example 37. A cross-section of each of the samples was subjected to the SEM-EDS analysis. As a result, it was recognized that, in any of the samples, there was a region in which the type of the ceramic shaped object was the type (I), a region being characterized in that an average of detection signals of Zr by SEM-EDS was larger in a region mainly containing Zr than in a region mainly containing Si, and an average of detection signals of Si by SEM-EDS, an average of detection signals of Y by SEM-EDS, and an average of detection signals of Al by SEM-EDS were larger in a region mainly containing Si than in a region mainly containing Zr. In each of those Examples, there is a region mainly containing Al in which a detection signal of Zr and a detection signal of Si are small, and a detection signal of Al is large. When Averages of detection signals of Al by SEM-EDS are compared to each other between a region mainly containing Zr and a region mainly containing Si, an average is larger in the region mainly containing Si. Thus, it can be determined that the type of the ceramic shaped object is the type (I). The EDS element mapping images of Zr, Si, Y, and Al of Example 37 are shown in FIG. 5(*h*).

Examples 38 and 39

In Examples 38 and 39, SiO particles and $Al_2O_3$ particles were weighed at ratios of 0.117 g and 0.90 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,690° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 278 MPa in Example 38 and 203 MPa in Example 39.

Examples 40 and 41

In Examples 40 and 41, SiO particles and $Al_2O_3$ particles were weighed at ratios of 0.055 g and 0.42 g, respectively, with respect to 10 g of 3YSZ(Al) particles, and those materials were uniformly mixed to provide inorganic material powders having composition ratios shown in Table 1 as powders for shaping formed of elements of Zr, Y, Si, and Al. The powders were shaped into intermediate shaped objects for forming ceramic shaped objects. The intermediate shaped objects were subjected to heat treatment at 1,690° C. and 1,790° C., respectively, and were each processed into a size of 4 mm (width)×3 mm (thickness)×38 mm (total length) to provide a test piece for a three-point flexural strength test. Two each of the test pieces thus produced were subjected to the three-point flexural strength test. Averages of three-point flexural strengths were 151 MPa in Example 40 and 325 MPa in Example 41.

Comparative Example 1

In Comparative Example 1, while the inorganic material powder composition was the same as that of Example 9, $SiO_2$ (amorphous silica HS207, manufactured by NIPPON STEEL Chemical & Material Co., Ltd.) having a median of particle sizes of 9.5 μm was used as silica particles. In this inorganic material powder, the fluidity of the powder deteriorated through a reduction in particle size thereof, and hence the powder layer 302 was not able to be formed flat in the placement step. Thus, shaping was not able to be performed. From the foregoing, the powder fluidity was indicated by "B". In Comparative Examples except for Comparative Example 1 and Examples, shaping was able to be performed in the placement step, and hence the powder fluidity was indicated by "A".

Comparative Example 2

In Comparative Example 2, the following inorganic material powder composition was used: the ratio of SiO, which was an infrared absorber, was set to ¼ as compared to that in Example 20. Although a fluidity of the powder was not a problem, a low addition ratio of the infrared absorber caused a reduction in shaping property to produce a porous non-uniform intermediate shaped object with a large number of chipping, with the result that an intermediate shaped object in a state in which the heat treatment step was able to be performed was not able to be obtained. From the foregoing, the shaping property was indicated by "B". In each of Comparative Examples except Comparative Examples 1 and 2 and Examples, an intermediate shaped object in a state in which the heat treatment step was able to be performed was able to be obtained, and hence the shaping property was indicated by "A".

Comparative Example 3

In Comparative Example 3, $Al_2O_3$ particles and SiO particles were weighed at ratios of 12.08 g and 0.47 g, respectively, with respect to 10 g of $SiO_2$ particles, and those materials were uniformly mixed to provide an inorganic material powder having a composition ratio shown in Table 1 as a powder for shaping formed of elements of Si and Al. The powder was shaped into an intermediate shaped object for forming a ceramic shaped object. The intermediate shaped object was subjected to heat treatment at a treatment temperature of 1,690° C., and was processed into a size of 4 mm (width)×3 mm (thickness)×38 mm (total length) to provide a test piece for a three-point flexural strength test. Here, $Al_2O_3$ powder having a median of particle sizes of 20 μm (AS-20S, manufactured by Showa Denko K.K.) was used. In addition, an infrared laser scanning speed of 130 mm/sec was adopted as a condition for producing the intermediate shaped object so that a dense state was maintained, while the speed was 160 mm/see in Examples. Two of the ceramic shaped objects thus produced were subjected to the three-point flexural strength test. An average of three-point flexural strengths was 108 MPa.

Thus, the ceramic shaped object produced by using a material system formed of $SiO_2$, $Al_2O_3$, and SiO had a three-point flexural strength of less than 150 MPa while having a crack self-repairing function.

Comparative Example 4

In Comparative Example 4, $Gd_2O_3$ particles and $Tb_4O_7$ particles were weighed at ratios of 9.52 g and 0.86 g, respectively, with respect to 10 g of $Al_2O_3$ particles, and those materials were uniformly mixed to provide an inorganic material powder having a composition ratio shown in Table 1 as a powder for shaping formed of elements of Al, Gd, and Tb. The powder was shaped into an intermediate shaped object for forming a ceramic shaped object. The step of impregnating the crack of the intermediate shaped object with Zr serving as a modifier was performed once, and a heat treatment step was performed at 1,690° C. After that, the process from the Zr impregnation step to the heat treatment step was further performed twice. Thus, the crack was repaired through the three impregnation steps and the three heat treatment steps in total. Further, the resultant was processed into a size of 4 mm (width)×3 mm (thickness)×38 mm (total length) to provide a test piece for a three-point flexural strength test. Two of the test pieces were subjected to the three-point flexural strength test. It was recognized that the average of three-point flexural strengths was 140 MPa. In this Comparative Example, $Al_2O_3$ powder (CB-A20S, manufactured by Showa Denko K.K.) having a median of particle sizes of 24 μm was used. In addition, an infrared laser scanning speed of 130 mm/sec was adopted as a condition for producing the intermediate shaped object so that a dense state was maintained, while the speed was 160 mm/sec in Examples.

Thus, the ceramic shaped object produced by using a material system formed of $Al_2O_3$, $Gd_2O_3$, and $Tb_4O_7$ was subjected to the crack repairing by the Zr impregnation and the heat treatment, but had a three-point flexural strength of less than 150 MPa. In each of Examples 1 to 29 except for Examples 17 and 18, the three-point flexural strength larger than that of Comparative Example 4 was able to be achieved.

According to this embodiment, there can be provided a technology advantageous for producing a ceramic shaped object having high strength through use of an additive manufacturing technology.

According to this embodiment, there can be provided a ceramic shaped object containing zirconium oxide, which can have a mechanical strength of 150 MPa or more, further 200 MPa or more and has a fine crack-repairing property, through use of a direct manufacturing system (powder bed fusion or infrared laser melting method).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075157, filed Apr. 28, 2023, Japanese Patent Application No. 2023-086397, filed May 25, 2023, and Japanese Patent Application No. 2024-035293, filed Mar. 7, 2024, which are hereby incorporated by reference herein in their entirety.

What is claimed is:

1. A powder for ceramic shaping to be used in an additive manufacturing method involving performing shaping through irradiation with laser light, the powder for ceramic shaping comprising oxide particles, wherein the oxide particles each contain a plurality of elements including at least Zr, Y, Si, and optionally Al, and contain at least silicon monoxide particles, and wherein when a content of the Zr is converted into a mass of $ZrO_2$, a content of the Y is converted into a mass of $Y_2O_3$, a content of the Si is converted into a mass of $SiO_2$, and a content of the Al is converted into a mass of $Al_2O_3$, the mass of $ZrO_2$, the mass of $Y_2O_3$, and the mass of $SiO_2$ with respect to a total amount of the mass of $ZrO_2$, the mass of $Y_2O_3$, the mass of $SiO_2$, and the mass of $Al_2O_3$ are represented by α (mass %), β (mass %), and γ (mass %), respectively, α, β, and γ satisfy expressions:

$$77.64 \leq \alpha \leq 93.06$$

$$4.42 \leq \beta \leq 6.49$$

$$0.72 \leq \gamma \leq 17.29.$$

2. The powder for ceramic shaping according to claim 1, wherein the oxide particles contain silicon dioxide particles.

3. The powder for ceramic shaping according to claim 1, wherein the oxide particles contain yttria-stabilized zirconia particles.

4. The powder for ceramic shaping according to claim 1, wherein when the silicon monoxide particles each do not contain a region except for silicon monoxide, an average particle size of particles except for the silicon monoxide particles out of the oxide particles is 10 μm to 200 μm, and is larger than an average particle size of the silicon monoxide particles.

5. The powder for ceramic shaping according to claim 1, wherein when the silicon monoxide particles each do not contain a region except for silicon monoxide, an average particle size of the silicon monoxide particles is 1 μm to 10 μm, and is ⅕ or less of an average particle size of particles except for the silicon monoxide particles out of the oxide particles.

6. The powder for ceramic shaping according to claim 1, wherein when the silicon monoxide particles each include a region except for silicon monoxide, an average particle size of the silicon monoxide particles is 5 μm to 200 μm.

7. The powder for ceramic shaping according to claim 1, wherein the oxide particles contain alumina-added yttria-stabilized zirconia particles.

8. The powder for ceramic shaping according to claim 1, wherein the oxide particles each contain Al, and wherein when the mass of $Al_2O_3$ with respect to the total amount of the mass of $ZrO_2$, the mass of $Y_2O_3$, the mass of $SiO_2$, and the mass of $Al_2O_3$ is represented by δ (mass %), δ satisfies expressions:

$$0.21 \leq \delta \leq 9.17.$$

9. The powder for ceramic shaping according to claim 1, wherein a content of the silicon monoxide particles in the oxide particles is 0.5 vol % to 53 vol %.

10. The powder for ceramic shaping according to claim 1, wherein the powder for ceramic shaping has a fluidity index of 40 (sec/50 g) or less.

11. The powder for ceramic shaping according to claim 1, wherein the powder for ceramic shaping does not contain a resin binder.

12. The powder for ceramic shaping according to claim 1, wherein the powder for ceramic shaping does not contain elemental carbon.

* * * * *